United States Patent [19]
Nishimura

[11] Patent Number: 5,949,525
[45] Date of Patent: Sep. 7, 1999

[54] AUTOMATIC PHOTOGRAPHIC PROCESSOR APPARATUS AND IDENTIFICATION PHOTOGRAPH STRIP WITH OUTLINE MARKINGS PRODUCED THEREBY

[75] Inventor: Ken Nishimura, Wakayama, Japan

[73] Assignee: Noritsu Koki Co., Ltd., Wakayama, Japan

[21] Appl. No.: 08/940,534

[22] Filed: Sep. 30, 1997

Related U.S. Application Data

[62] Division of application No. 08/641,975, May 2, 1996, Pat. No. 5,717,958.

[30] Foreign Application Priority Data

| May 9, 1995 | [JP] | Japan | 7-110821 |
| May 9, 1995 | [JP] | Japan | 7-110822 |
| Jun. 7, 1995 | [JP] | Japan | 7-140672 |
| Jun. 23, 1995 | [JP] | Japan | 7-157929 |
| Nov. 22, 1995 | [JP] | Japan | 7-304587 |
| Mar. 26, 1996 | [JP] | Japan | 8-70360 |

[51] Int. Cl.$^6$ .................................................. G03D 27/52
[52] U.S. Cl. .............................. 355/40; 355/41; 355/77; 400/70; 400/621; 358/449; 358/296; 395/117
[58] Field of Search .................................. 355/40, 41, 77, 355/68; 399/16; 358/453, 296, 449; 400/70, 621; 395/117

[56] References Cited

U.S. PATENT DOCUMENTS

| 3,820,136 | 6/1974 | Kennedy | 358/453 |
| 4,965,673 | 10/1990 | Bozzo et al. | 348/722 |
| 5,072,246 | 12/1991 | Thayer, Jr. | 396/2 |
| 5,199,081 | 3/1993 | Saito et al. | 235/380 |
| 5,223,939 | 6/1993 | Imaizumi et al. | 358/296 |
| 5,229,802 | 7/1993 | Shiota et al. | 396/564 |
| 5,264,683 | 11/1993 | Yoshikawa | 235/375 |
| 5,576,794 | 11/1996 | DeMarti, Jr. et al. | 396/564 |
| 5,651,618 | 7/1997 | Tamiya | 400/70 |

FOREIGN PATENT DOCUMENTS

| 626 611 | 11/1994 | European Pat. Off. . |
| 94/28461 | 12/1994 | WIPO . |

*Primary Examiner*—D. Rutledge
*Attorney, Agent, or Firm*—Wenderoth, Lind & Ponack, L.L.P.

[57] ABSTRACT

An automatic photographic processor apparatus automatically produces a strip of photographic prints, e.g. identification photos or self-portraits, in a short period of time with cutline markings.

2 Claims, 30 Drawing Sheets

AUTOMATIC PHOTOGRAPHIC PROCESSOR APPARATUS AND IDENTIFICATION PHOTOGRAPH STRIP WITH OUTLINE MARKINGS PRODUCED THEREBY

This is a divisional application of Ser. No. 08/641,975, filed May 2, 1996, now U.S. Pat. No. 5,717,958.

BACKGROUND OF THE PRESENT INVENTION

The present invention relates to an automatic photographic processor apparatus for automatically producing a set of photographic prints, e.g. identification photos or self-portraits, in a short period of time when a human object or client has shot or taken an image of himself or herself, a paper feeder device, an outdoor installation booth and an object image capturing mechanism mounted in the automatic photographic processor apparatus, and to an identification photograph strip with cutline markings.

Automatic photographic processor apparatuses installed in their respective booths are generally located in stations and other public places for producing a set of photographic prints, e.g. identification photos or self-portraits, in 1 to 3 minutes after a client takes an image of himself.

Such an automatic photographic processor apparatus located in a station allows a client to take an image of himself by following steps of a shooting procedure explained in an instruction in a booth and then starts operating a printing paper feeder device for conveying a tape of printing paper to a printing stage. A predetermined number of images of an upper half of the client are automatically printed on the printing paper which is then subjected to development.

One to three minutes later, resultant prints are discharged from the automatic photographic processor apparatus.

As the prints are discharged, they are directly received by the client who has been waiting.

Commonly, the printing paper feeder device in a known automatic photographic processor apparatus is provided with a single roll of printing paper (127 mm wide, 50 m long) for producing a number of prints.

Also, the booth in which the automatic photographic processor apparatus is installed includes outer walls covered with thermal insulating materials of open-cell foam structure, a fan for ventilation, and a heater for maintaining a constant temperature in the booth by heating up in response to a temperature drop.

There is a height adjustable bench provided in the booth for allowing the client to seat and shoot an image of himself with a camera located at an opposite position. However, as the positioning of himself to the camera is limited, the client is not allowed to check for framing or the like. An improved modification of the known automatic photographic processor apparatus is disclosed in Japanese Patent Laid-open Publication 6-110127 (1994). The modification allows each image produced by an imaging means such as a camera to be transferred to a central processing unit where it is processed to appear on a screen an optical axis of which coincides with the optical axis of the imaging means by a half mirror located across a bisector line between the imaging means and mirror. Also, the central processing unit produces control data from the image to drive a photographic printing means, e.g. a printer, for completing optimum prints.

The known automatic photographic processor apparatus produces a predetermined number of identical prints of a desired size from one single image and discharges them through a discharge outlet. Actually, the overall size of each print is slightly larger than the desired size. This requires the client to remove a marginal section by cutting with scissors or a cutter to have the prints of the desired size. Accordingly, the known automatic photographic processor apparatus has some drawbacks.

For example, the known automatic photographic processor apparatus contains 50 (printing) paper sheets and a cartridge of ink ribbon (for printing 100 sheets) which should be replenished every few days. It is difficult and costly to repeat replenishment (including a maintenance routine) for (printing) paper and ink ribbon on a plurality of the automatic photographic processor apparatuses. To make matters worse, the automatic photographic processor apparatuses are different in consumption of the paper sheets. The replenishment task will thus be carried out on time with difficulty.

In practice, the automatic photographic processor apparatuses are inspected by service personnel periodically (once a month or 15 days) who systematically replaces the existing (printing) paper with a new roll while replenishing a developer agent. As the existing roll of printing paper is replaced regardless of its remaining length, it will never be consumed entirely during a common service period. The periodical replacement is hence uneconomical. Another drawback is that the automatic photographic processor apparatus cannot be used during the replacement of the roll thus leaving a possible client waiting.

The booth of the known automatic photographic processor apparatus includes outer walls of open-cell foamed thermal insulating material which is substantially high in ventilating capability but low in insulating efficiency, thus hardly maintaining optimum operational conditions of the automatic photographic processor apparatus. The fan for ventilation in the booth is rarely capable of keeping the temperature in the booth to a constant level because the temperature should be different between an upper region (higher) and a lower region (lower) of the booth. This will limit the location of relevant devices of the automatic photographic processor apparatus in the booth. If the booth is placed outside and exposed to intense sunlight during the summer, its temperature will abruptly rise above the limit level and seriously affect the development of prints. It is extremely difficult to ensure stable operations of any thermally sensitive digital image processor under such a highly unstable temperature condition in the booth.

As shown in FIGS. 31 and 32, the known automatic photographic processor apparatus employs a half mirror 101' located across a bisector line for coinciding the optical axis 102a' of an imaging means 102' with the optical axis 103a' of a screen 103'. In case of a passport photo which is a type of identification photograph and strictly regulated regarding location and size of an object face and overall dimensions, the face is always shot from a lower angle and its image appears facing above but not straight.

Furthermore, a group of the prints produced and discharged from the automatic photographic processor apparatus have to be separated by the client cutting with scissors or a cutter. As will be understood, the cutting to an identical size is not easy while balance between upper, lower, left, and right sides is maintained. It generally happens that the prints when separated are unbalanced relative to each other or the overall dimensions are decreased due to overtrimming in a series of cutting operations.

It is an object of the present invention to eliminate the foregoing drawbacks by providing an automatic photographic processor apparatus in which a plurality of cartridges are loaded in a storage and systematically used one by one for enabling a non-stop long-run operation without the need of manual service.

It is another object of the present invention to provide a paper feeder device for use in an automatic photographic processor apparatus in which each roll of printing or thermal transfer paper can be used up to its trailing end without loss and replaced with a new, unused roll without stopping the operation of the automatic photographic processor apparatus.

It is a further object of the present invention to provide an outdoor installation booth for an automatic photographic processor apparatus capable of being installed at any place such as an outside location where it is exposed to direct sunlight while preventing an automatic shooting device mounted in the apparatus from being affected by a change in the ambient temperature.

It is a still further object of the present invention to provide an object image capturing mechanism for use in an automatic photographic processor apparatus in which the face of an object client is shot directly from the front with a camera level with the eyes of the client, thus avoiding a low angle shot.

It is a still further object of the present invention to provide an identification photograph strip with cutline markings and an automatic photographic processor apparatus for producing the identification photograph strip with cutline markings in which an identification photo print is instantly produced at lower cost and easily separated from the strip by cutting with a cutter or the like to a desired size without impairing its proportional balance.

SUMMARY OF THE INVENTION

For achievement of the foregoing objects, the following arrangements are provided.

An automatic photographic processor apparatus of the present invention includes a printer for printing an image on a sheet of paper; a cartridge feeder for storing a plurality of cartridges and feeding them in sequence to a predetermined location; a transfer unit provided with a cartridge holding chuck device for removing a used cartridge from the printer, and unloading a new, unused cartridge from the cartridge feeder and loading it to the printer; and a paper feeder for automatically feeding the sheet of paper from a roll.

A paper feeder device for use in an automatic photographic processor apparatus according to the present invention is characterized in that a pair of paper feeding means are switched one from the other by forward and backward switching operations of a driving means for selectively feeding a sheet of paper from its roll loaded in desired one of the two paper feeding means.

Also, the paper feeder device for use in an automatic photographic processor apparatus is characterized by two pairs of paper feed rollers for feeding sheets of paper from their rolls by pinching them therebetween and a one-way clutch mounted on each pair of the paper feed rollers which are driven in opposite directions by a driver device. When one of the two pairs of the paper feed rollers are rotated through the one-way clutch by a forward or backward movement of the driver device for feeding a sheet of paper from a desired roll, the other pair of the paper feed rollers remain idle due to release of its one-way clutch.

An outdoor installation booth for an automatic photographic processor apparatus according to the present invention has a given shape for and size for accommodating the automatic photographic processor apparatus and is characterized by an outer wall of its shell being made of a closed-cell foam type thermal insulating material and a combination of a ventilation fan and an air conditioner mounted in upper and lower regions of the booth shell respectively.

The outdoor installation booth for accommodating an automatic photographic processor apparatus is further characterized by a lighted signboard mounted outside on the top of the booth shell.

An object image capturing mechanism for use in an automatic photographic processor apparatus according to the present invention comprises: a camera mounted opposite to and spaced by a distance from an object client; a monitor arranged at a right angle to the optical axis of the camera; and a half mirror mounted across and at a given angle to the optical axis of the camera. The monitor displays an image taken by the camera. The optical axis of the monitor is reflected by the half mirror and allows the client to view the monitor. The camera is located at a position such that its optical axis is not coincided with the optical axis of the monitor on the half mirror.

The camera is dislocated from the optical path of the monitor after being reflected by the half mirror by 10 to 20 mm towards the monitor.

An identification photograph strip with cutline markings according to the present invention is characterized in that at least one photograph print of a desired pattern size printed on a printing sheet is accompanied with cutline markings which are marked down outside the print for ease of cutting to the desired size.

Also, the identification photograph strip with cutline markings is modified wherein left and right cutting markings of the cutline markings are located above and below the photograph print of the pattern size on the printing sheet, inside the left and right sides of the same, and upper and lower markings of the cutline markings are on the left and right sides of the print, inside the upper and lower sides of the same.

An automatic photographic processor apparatus for producing an identification photograph strip with cutline markings includes a reading means for reading an image, an arithmetic operating device including a calculating means for converting data of the image read to a specified size format and an editing means for editing the image data from the calculating means to produce a background image data with cutline markings; and a printer for producing identification photograph prints from the image data supplied from the editing means.

In the automatic photographic processor apparatus of the present invention, upon receiving a detection signal indicative of the trailing end of an ink ribbon in the cartridge at the printer, the transfer unit drives the chuck device to unload the used cartridge from the printer and convey it to a discharge location. The chuck device of the transfer unit is then moved to a cartridge feed location in the cartridge feeder.

Accordingly, the used cartridge is unloaded from the printer and replaced with one of the new, unused cartridges stored in the cartridge feeder by the operation of the chuck device.

The new cartridge is conveyed by the transfer unit to the printer. When the new cartridge has been released from the chuck device and loaded to the printer, the transfer unit with the chuck device is moved back to its original position.

Also, a sheet of paper to be used in the printer is sequentially fed from its roll loaded in the paper feeder.

As described, the cartridge is automatically replaced with a new cartridge while the sheet of paper is continuously fed by the paper feeder, allowing the apparatus to run for a long period of time without the need of manual service. In other words, the replenishment of cartridges and paper will be carried out only at extended intervals.

In the paper feeder device in the automatic photographic processor apparatus, one of the two paper feeding means is driven by the forward (or backward) movement of the driving means while the other remains idle. A sheet of paper is thus fed from its roll at the side of the driven paper feeding means. The roll of paper set on the other side of the paper feed means is waiting to be transferred due to idling the paper feeding means. As set forth above, when the roll of paper being transferred runs out, the driving means controlled electrically is driven by the forward (or backward) movements and the other roll of paper is transferred. At the side of the idling paper feeding means, an empty roll may be replaced with a new roll.

Accordingly, the two rolls of paper loaded in place can be used alternately without stopping the paper feeder device in the automatic photographic processor apparatus.

The paper feeder device in the automatic photographic processor apparatus allows the drive device to rotate two pairs of paper feed roller in opposite directions. Due to the operation of the one-way clutch linked to each pair of the paper feed rollers, a desired pair of the paper feed rollers are driven. Simultaneously, the other pair of the paper feed rollers remain idle due to a linked operation of its one-way clutch.

A sheet of paper is hence released from its roll and conveyed by a transfer action of the driven pair of the paper feed rollers by being pinched therebetween.

When the sheet of paper conveyed by the driven pair of the paper feed rollers has been used up, the drive device is electrically controlled to perform a reverse operation. This allows the paper feed rollers to rotate in reverse directions. The driven pair of the paper feed rollers are thus shifted by their one-way clutch to turn idle. Simultaneously, the idling pair of the paper feed rollers are linked to power transmission by their one-way clutch and start rotating and feeding out a sheet of paper from its roll.

In the outdoor installation booth of the automatic photographic processor apparatus of the present invention, the outer wall of its shell is made of the closed-cell foam type thermal insulating material thus to increase the thermal insulating effect. As the ventilation fan mounted in the upper region of the booth is operated synchronous with the air conditioner mounted in the lower region of the booth, the air can be circulated throughout the booth thus maintaining a uniform temperature. This prevents the automatic photographic processor apparatus installed in the booth from being affected by the outside temperature. It is also possible to install in the booth a temperature sensitive digital image processor and thus reduce the overall processing time considerably.

The outdoor installation booth of the automatic photographic processor apparatus of the present invention has the lighted signboard mounted on the top thereof thus forming a double roof construction. The lighted signboard prevents the booth from being exposed at the top to direct sunlight regardless of the location of the booth. This allows the booth to have increased thermal insulating effect.

In the object image capturing mechanism in the automatic photographic processor apparatus of the present invention, the optical axis of the camera is not coincided with the optical axis of the monitor. This allows the eyes of a client who is seated opposite to the camera to meet the optical axis of the camera and thus be photographed straight from the front. Accordingly, a resultant identification photograph print has a straight face front view of the client.

The object image capturing mechanism in the automatic photographic processor apparatus of the present invention allows the camera to be dislocated from the optical path of the monitor after being reflected on the half mirror by 10 to 20 mm towards the monitor. Accordingly, the line of view of the eye of a client who is seated opposite to the camera is overlapped with the optical axis of the camera. A resultant photograph print is a more accurate straight front view of the client.

The identification photograph strip with cutline markings of the present invention is provided with a photograph print of a desired pattern size that can be separated from a printing sheet by placing a rule between two corresponding cutline markings and cutting along the rule with a cutter. Accordingly, the desired size of the print is obtained without making a cutting error. The rule is placed between left and right markings and upper and lower markings of the cutline markings.

In the automatic photographic processor apparatus for producing the identification photograph print with the cutline markings according to the present invention, data of an image read with the reading means is calculated by the calculating means to a format of the passport size and combined by the editing means with a background image data of the cutline markings printed outside a pattern of the print. Upon receiving a resultant combined image data, the printer prints out a print of the image data with the cutline markings on a sheet of paper.

DETAILED DESCRIPTION OF THE PREFERRED EMBODIMENTS

Preferred embodiments 1 to 5 of the present invention will be described referring to the accompanying drawings of FIGS. 1 to 36. The numerals (1, 2, 3, . . . ) in each drawing are substantially independent from identical numbers in the other drawings. It should thus be noted that components denoted by like numerals are different more or less from each other in the construction while being similar substantially.

Embodiment 1

Figure 1:
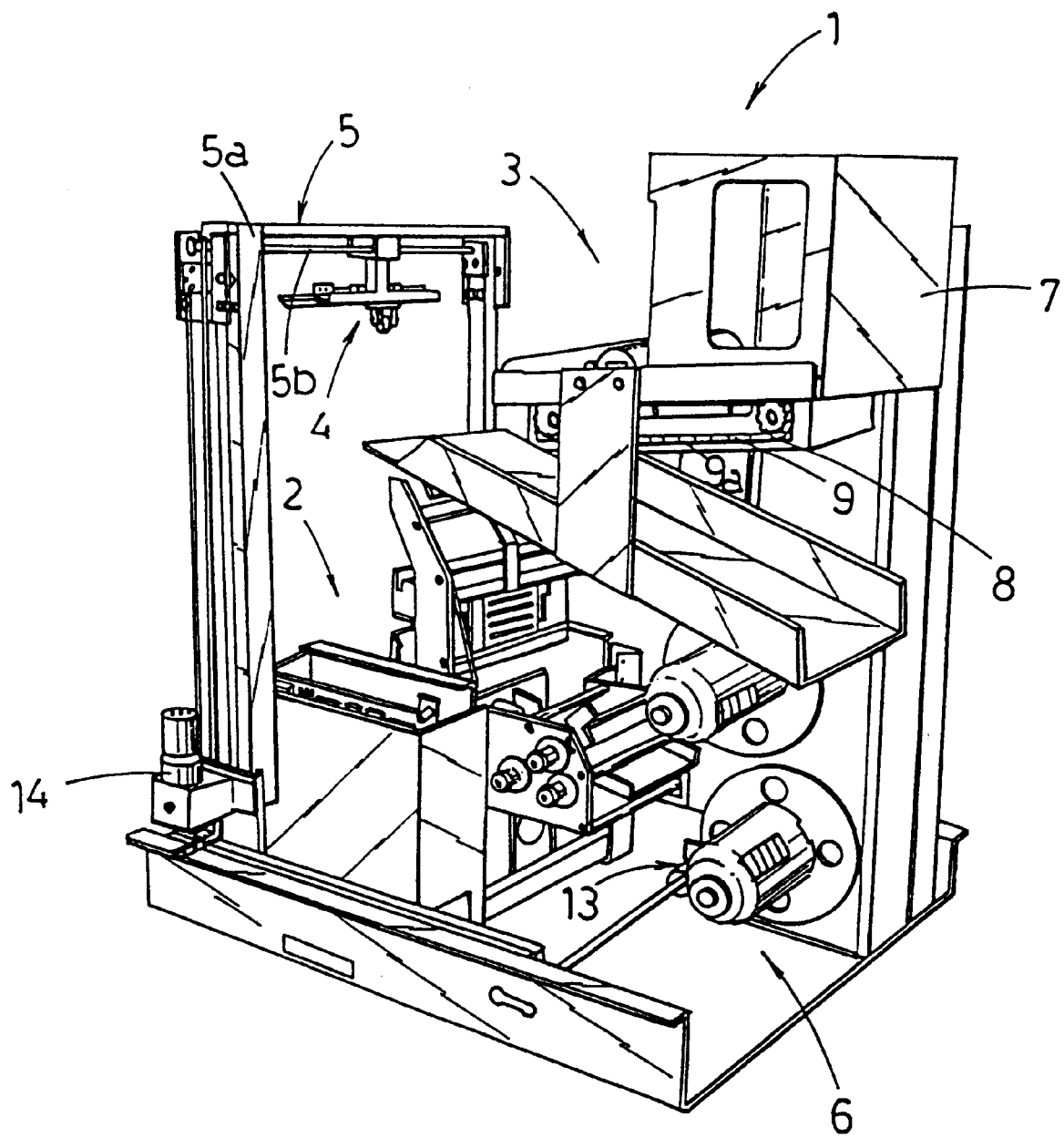
FIG. 1 is an overall perspective view, seen from a cartridge feeder side, of an automatic photographic processor apparatus showing Embodiment 1 of the present invention.
Figure 2:
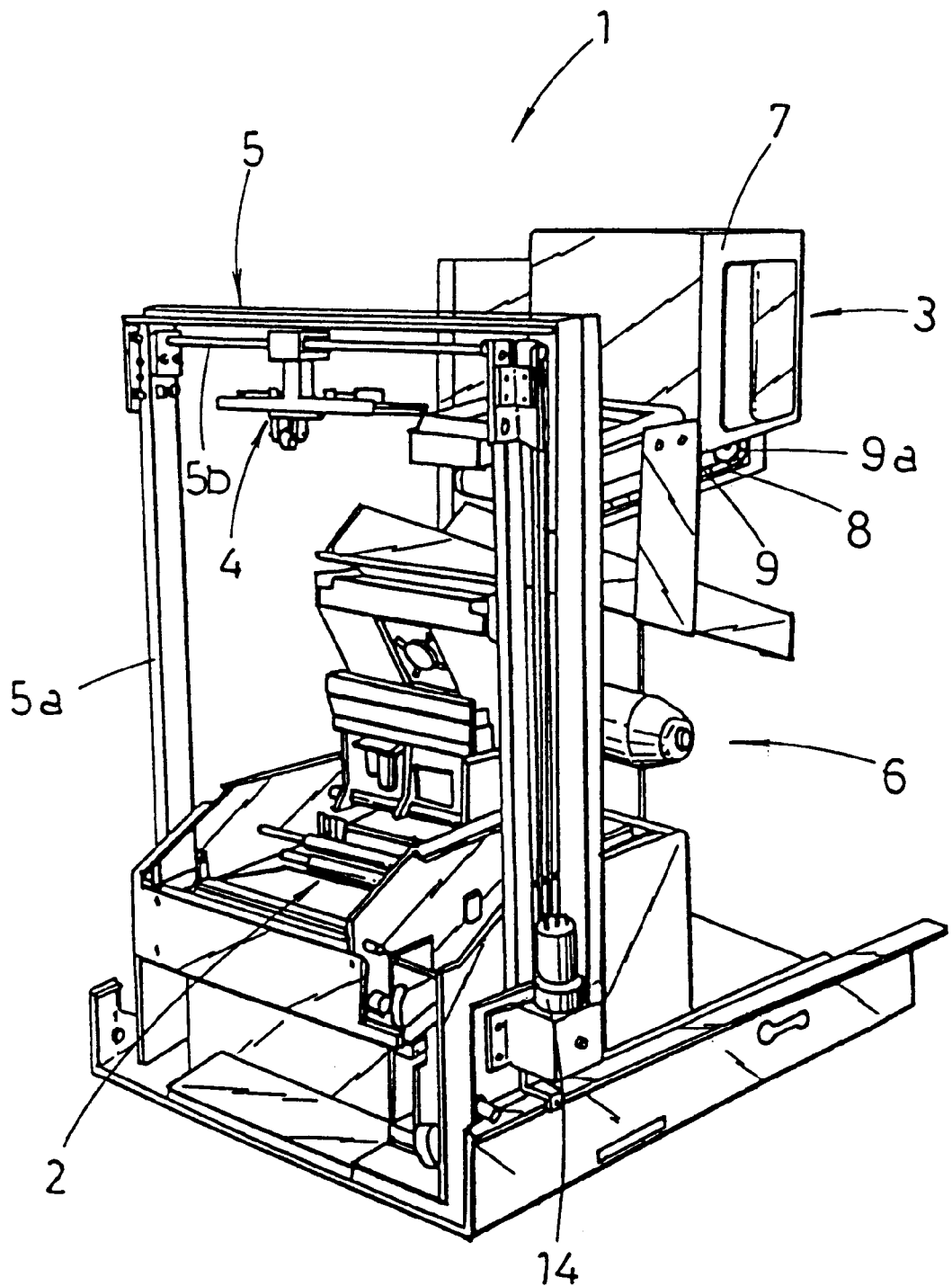
FIG. 2 is an overall perspective view, seen from a printer side, of the automatic photographic processor apparatus of Embodiment 1.
Figure 3:
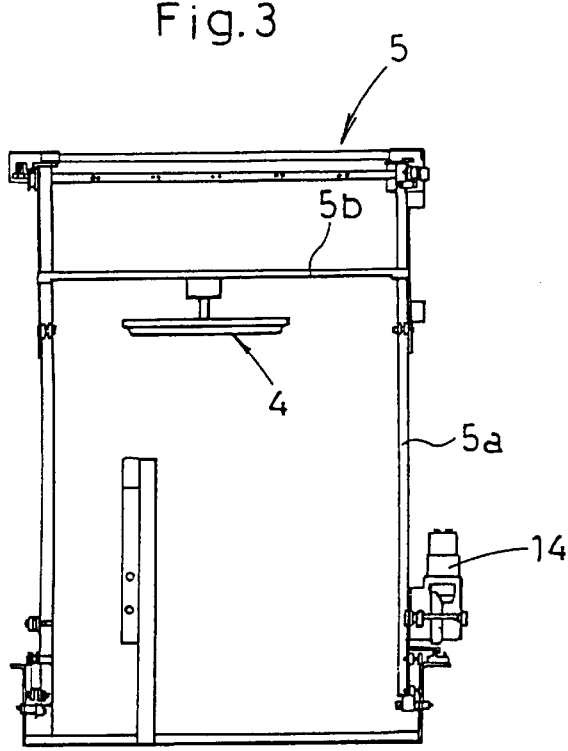
FIG. 3 is a schematic front view of a transfer unit in Embodiment 1.

Embodiment 1 of the present invention will first be explained referring to FIGS. 1 to 8. Embodiment 1 relates to an automatic photographic processor apparatus according to the present invention. Referring to FIGS. 1 and 2, the automatic photographic processor apparatus 1 comprises a printer 2, a cartridge feeder 3, a transfer unit 5 including a chuck device 4, and a paper feeder 6.

Figure 4:
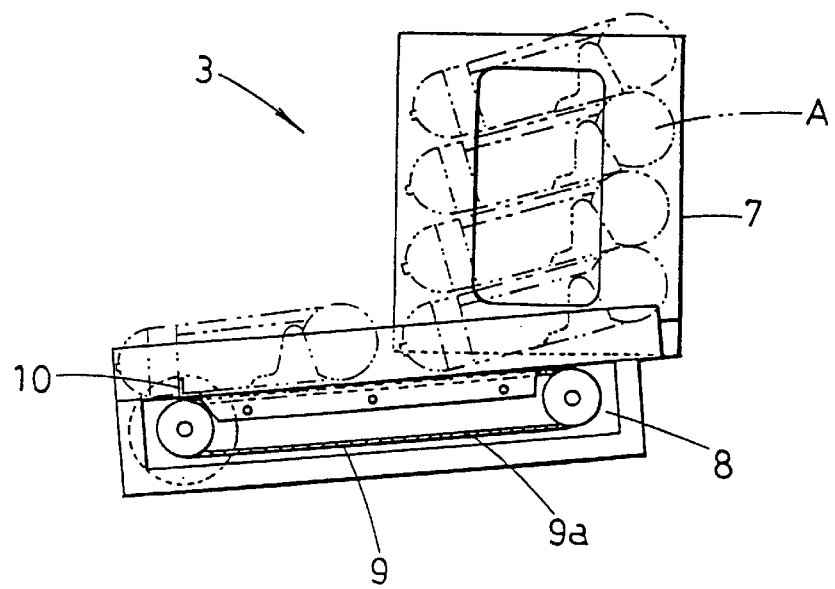
FIG. 4 is an explanatory view of a cartridge feeder in Embodiment 1.

The printer 2 is a digital color printer of e.g. thermal transfer type for printing an image on a sheet of thermal transfer printing paper supplied from the paper feeder 6 with the ink ribbon of a cartridge A (FIG. 4).

The cartridge feeder 3 comprises a cartridge storage 7 and a cartridge unloader 8, as best shown in FIG. 4. The cartridge storage 7 has a square tubular shape for vertical storage of a plurality of cartridges A, each cartridge containing an ink ribbon.

The cartridge unloader 8 comprises a chain conveyor 9 and a drive unit (not shown). The chain conveyor 9 includes a chain 9a provided with a detecting plate 10. As the chain conveyor 9 is driven, the detecting plate 10 draws out the lowest one of the cartridges A in the cartridge storage 7 and conveys it forward from the storage 7.

The detecting plate 10 is arranged to drive the cartridge A and operate with a sensor (not shown) for examining whether or not the cartridge A has been conveyed and remains at a given position forwardly of the cartridge storage 7.

Figure 5:
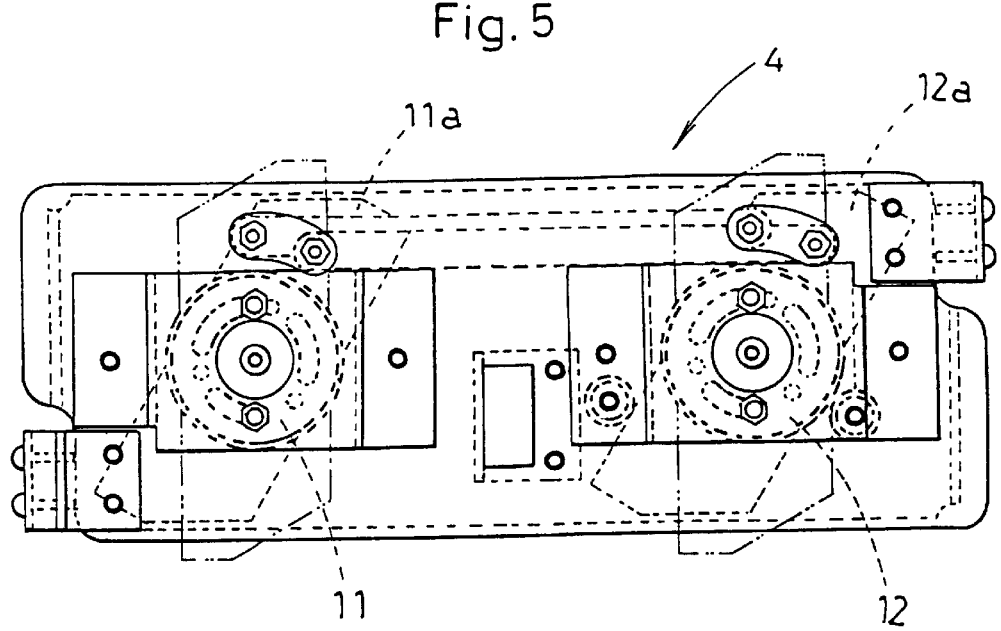
FIG. 5 is a plan view of a chuck device in Embodiment 1.
Figure 6:
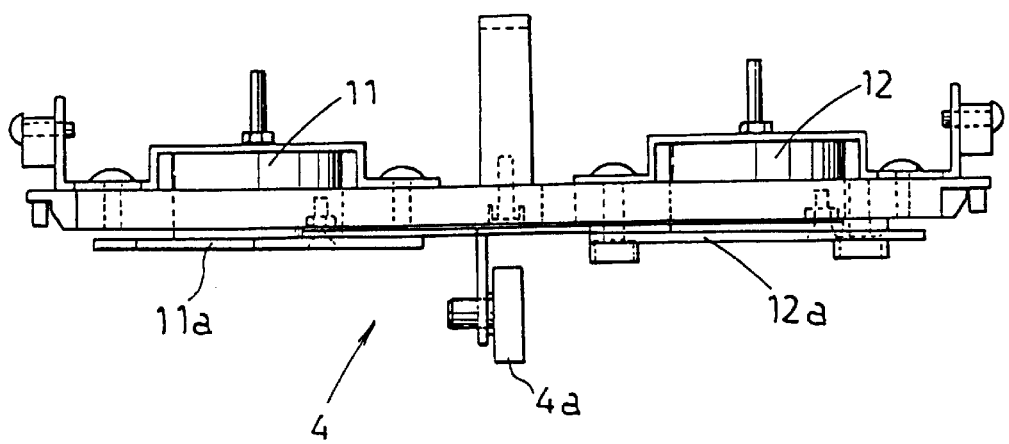
FIG. 6 is a front view of the chuck device of Embodiment 1.

The chuck device 4 is mounted to the transfer unit 5 for upward and downward movements as shown in FIGS. 5 and 6. More particularly, the chuck device 4 includes a pair of rotary solenoids 11 and 12 which have respective wings 11a and 12a. In operation, the wings 11a and 12a of their respective rotary solenoids 11 and 12 are rotated (or pivoted) to hold and release the cartridge A. The chuck device 4 also has a roller 4a for closing a cover 2a (FIG. 7) of the printer 2 which will be described later in more detail.

The two wings 11a and 12a are linked to each other. When the wing 12a is rotated clockwisely by the clockwise rotary solenoid 12, it moves into a casing of the cartridge A. When the wing 11a is turned counter-clockwise by the counter-clockwise rotary solenoid 11, it moves to a cassette holding location for holding the cartridge A from inside.

The transfer unit 5 (FIGS. 1 to 3) is arranged so that a portal frame 5a thereof is driven by an actuator 13 for forward and backward movements of the transfer unit 5, and a transverse frame 5b thereof mounted to the chuck device 4 is driven by an actuator 14 for upward and downward movements. By controlling the transfer unit 5 and the chuck device 4, the cartridge A is loaded to and unloaded from the printer 2 and also the cover 2a of the digital color printer machine in the printer 2 is opened and closed.

The paper feeder 6 is adapted to hold two rolls of the printing paper (not shown) which are selectively supplied to the printer 2 by forward or backward rotating operation of a drive unit. Upon one of the two rolls having been consumed up, the other is automatically fed to the printer 2 without producing any down time of the printer 2.

There is provided a chute 15 for removing an empty cartridge A. The prescribed components are safely installed in protective casings of minimum sizes.

Figure 7:
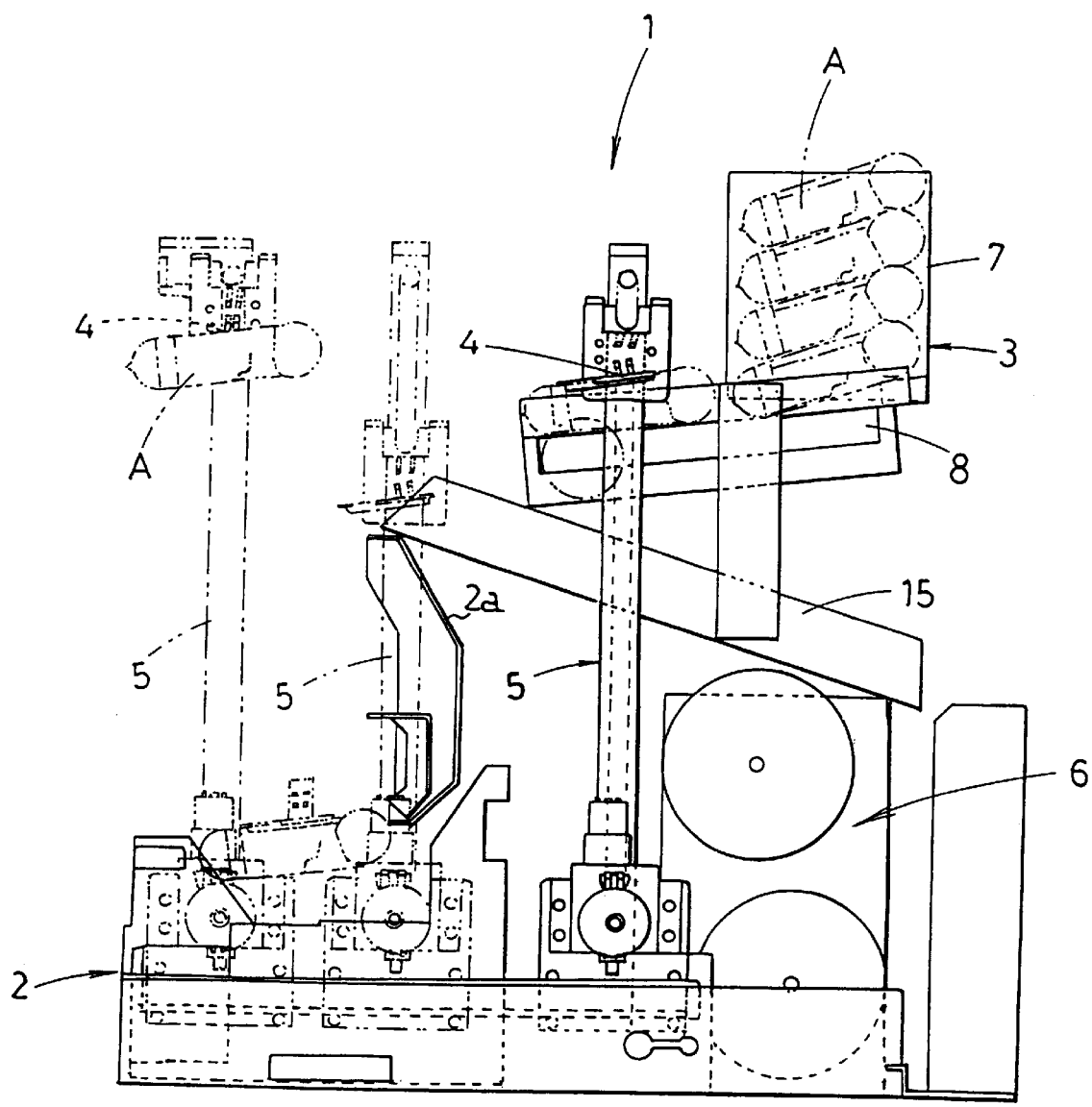
FIG. 7 is an explanatory view showing operation of the automatic photographic processor apparatus of Embodiment 1.
Figure 8:
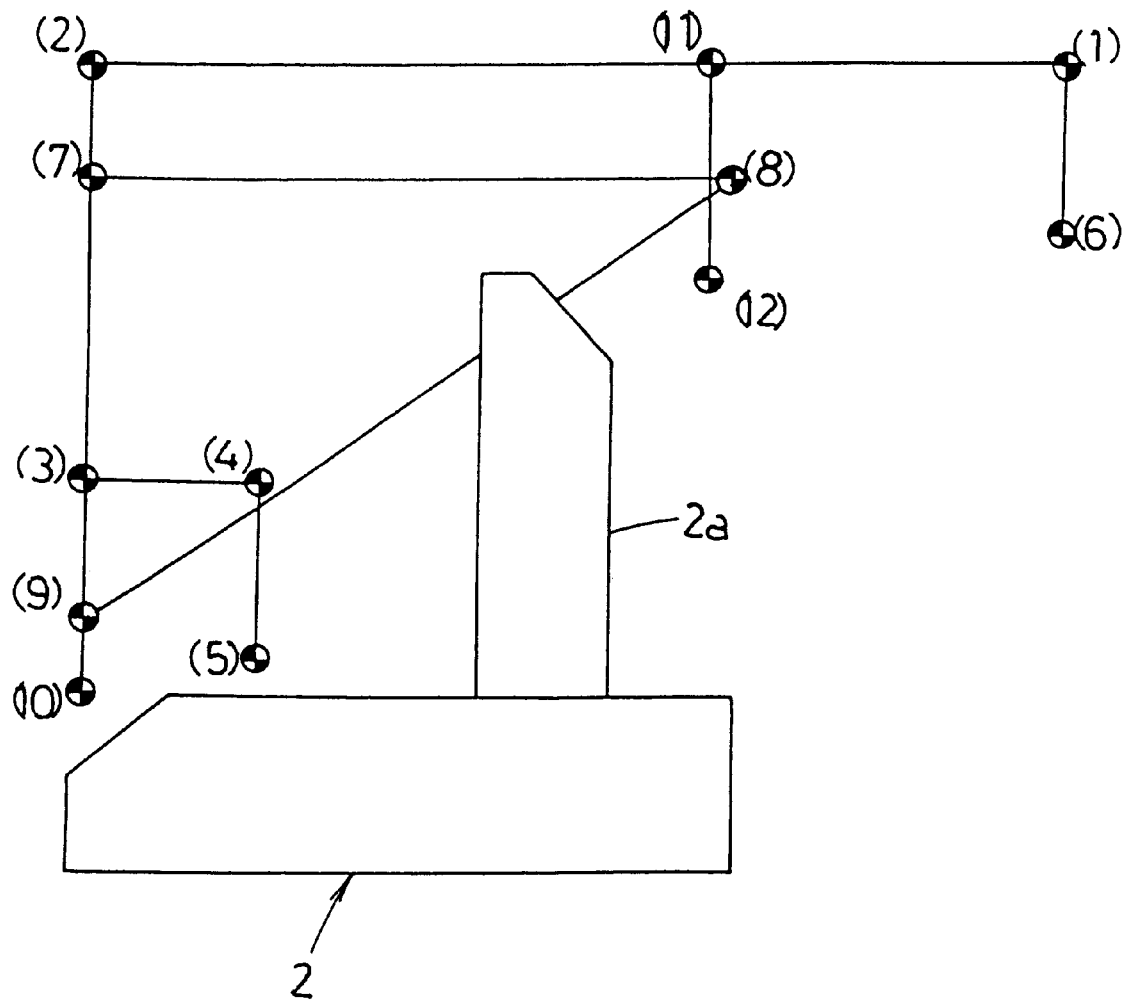
FIG. 8 is a diagram explaining a series of operations (1) to (12) of the automatic photographic processor apparatus of Embodiment 1.

The operation of the automatic photographic processor apparatus 1 will now be explained referring to FIGS. 7 and 8.

When the trailing end of an ink ribbon in the cartridge A loaded in the printer 2 is detected, a resultant detection signal releases the locking state of the cover 2a of the thermal transfer color printer machine. As a result, the cover 2a is opened by a wire and a counter weight which are not shown. The transfer unit 5 is then moved from a position (1) to a position (5) shown in FIG. 8. Upon picking up the used cartridge A with the chuck device 4, the transfer unit 5 carries it from (5) to (2), (11), and (12). At the position (12), the cartridge A is removed through the chute 15.

The transfer unit 5 travels from (12) to (11), (1), and (6) for picking up an unused cartridge A, and conveys it from (1) to (5) for loading to the printer 2. The transfer unit 5 further moves from (5) to (3), (7), and (8). As the roller 4a of chuck device 4 runs over to close the cover 2a of the thermal transfer color printer machine, the transfer unit 5 travels to (9) and (10). After a cycle of operation is completed, the transfer unit 5 moves back to its start position (1).

Meanwhile, the thermal printing paper is continuously supplied from its roll in the paper feeder 6 to the printer 2.

Embodiment 2

Embodiment 2 of the present invention will be described referring to FIGS. 9 to 23.

Embodiment 2 illustrates a paper feeder device installed in an automatic photographic processor apparatus of the present invention. As its primary parts are illustrated in the drawings, the paper feeder device feeds a printing paper from one of two rolls and, upon such one roll being consumed, switching to the other roll.

Figure 9:
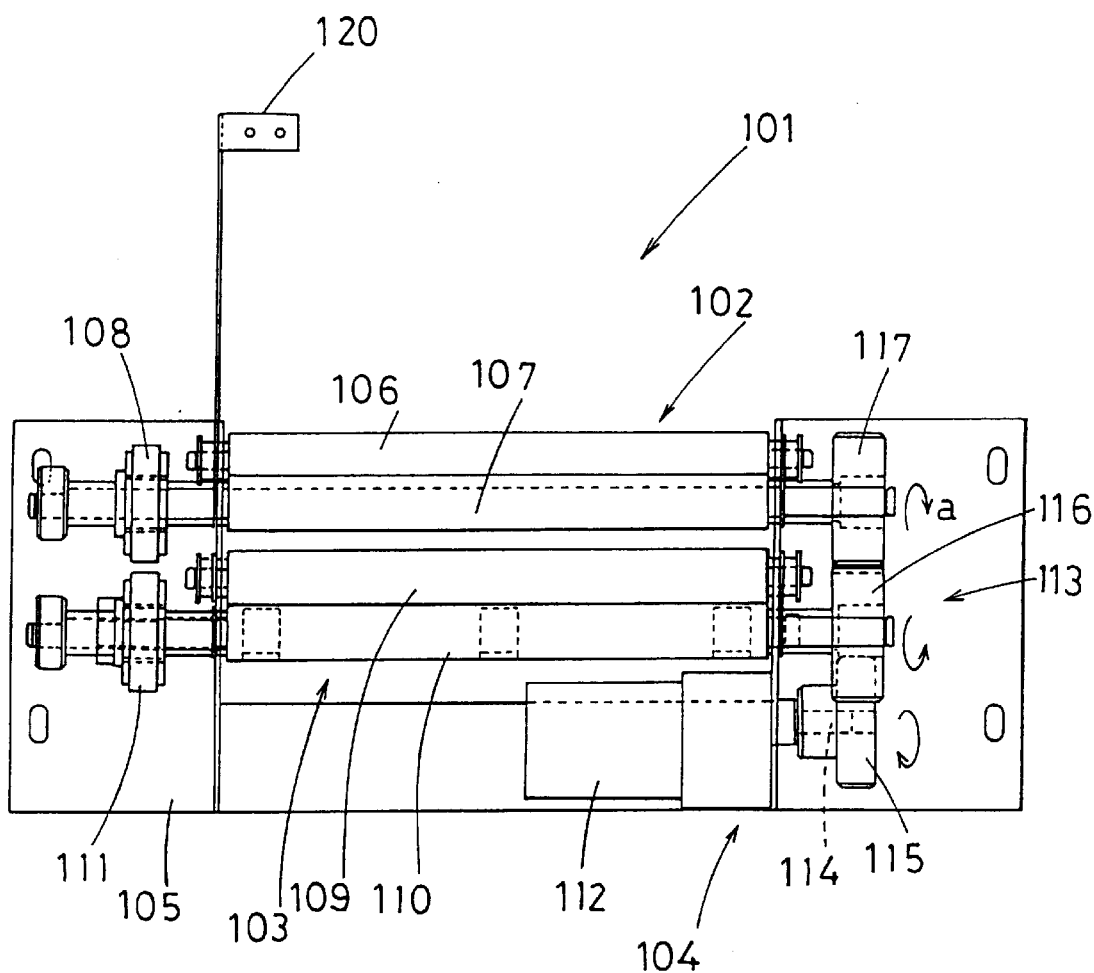
FIG. 9 is a front view of a paper feeder device showing Embodiment 2 the present invention, in which an upper pair of paper feed rollers are driven in an automatic photographic processor apparatus.
Figure 10:
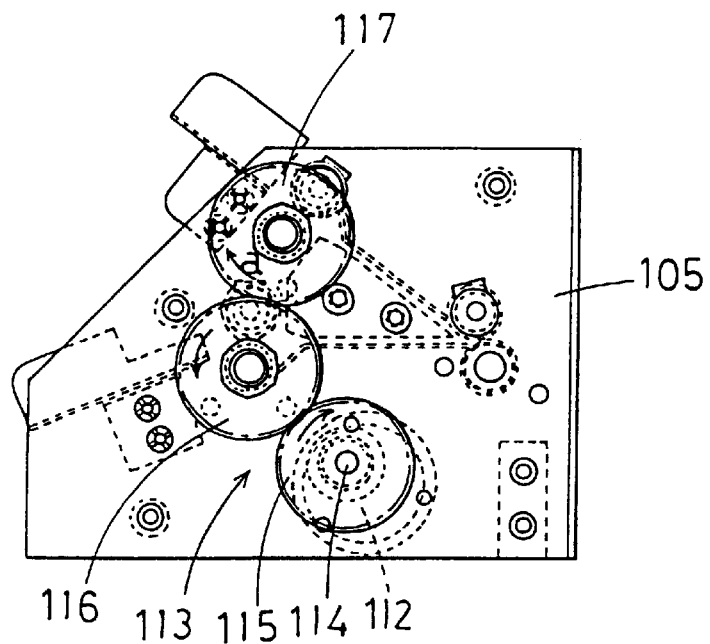
FIG. 10 is a right side view of the paper feed rollers shown in FIG. 9.
Figure 11:
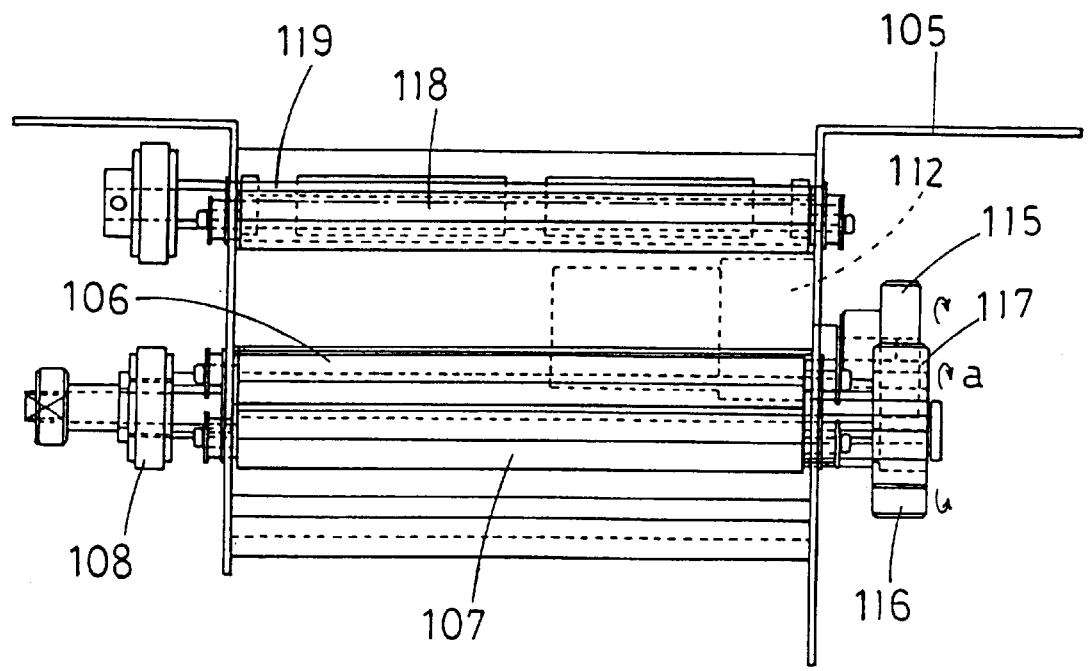
FIG. 11 is a plan view of the paper feed rollers shown in FIG. 9.
Figure 12:
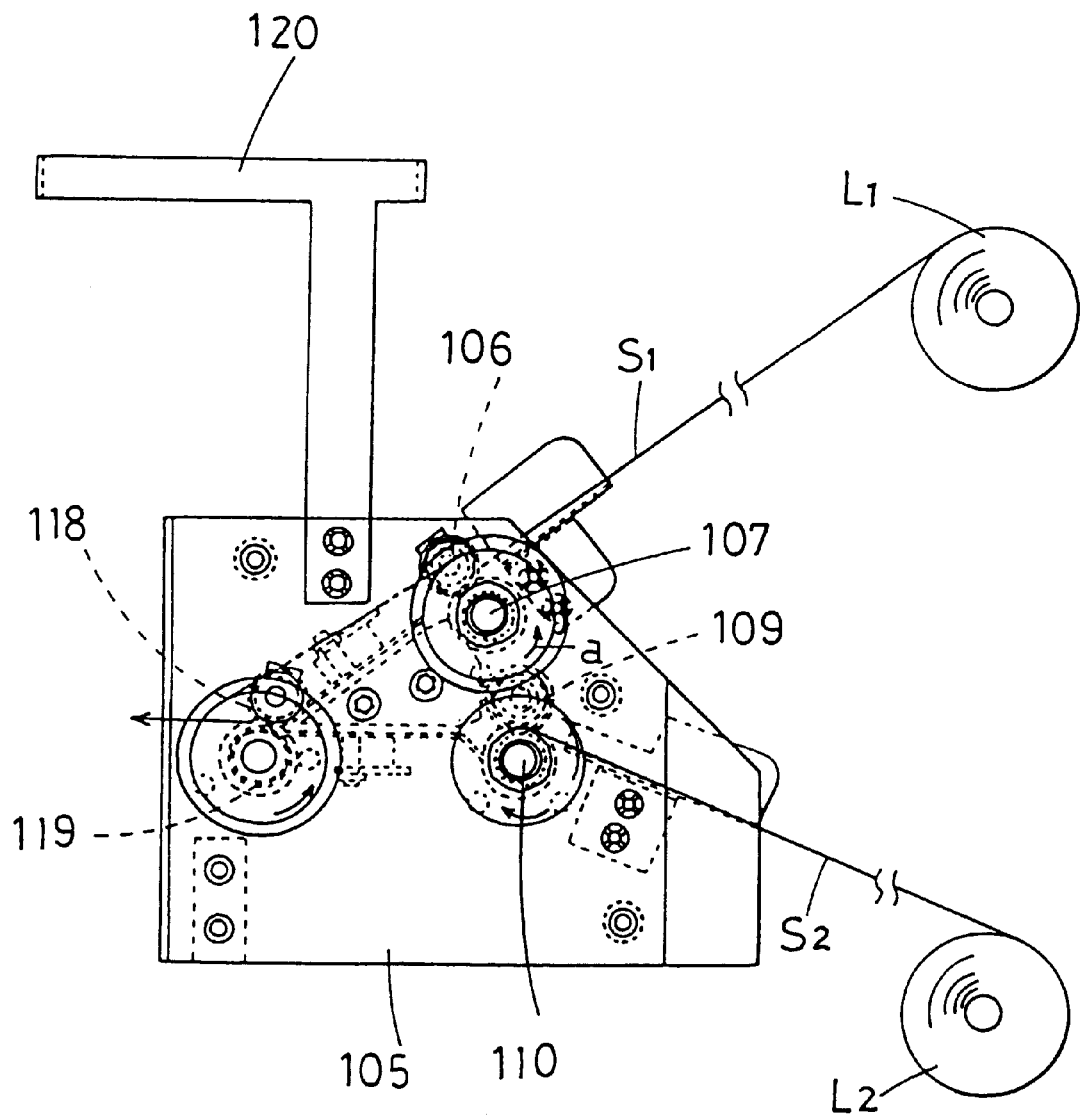
FIG. 12 is a left side view of the paper feed rollers shown in FIG. 9.
Figure 13:
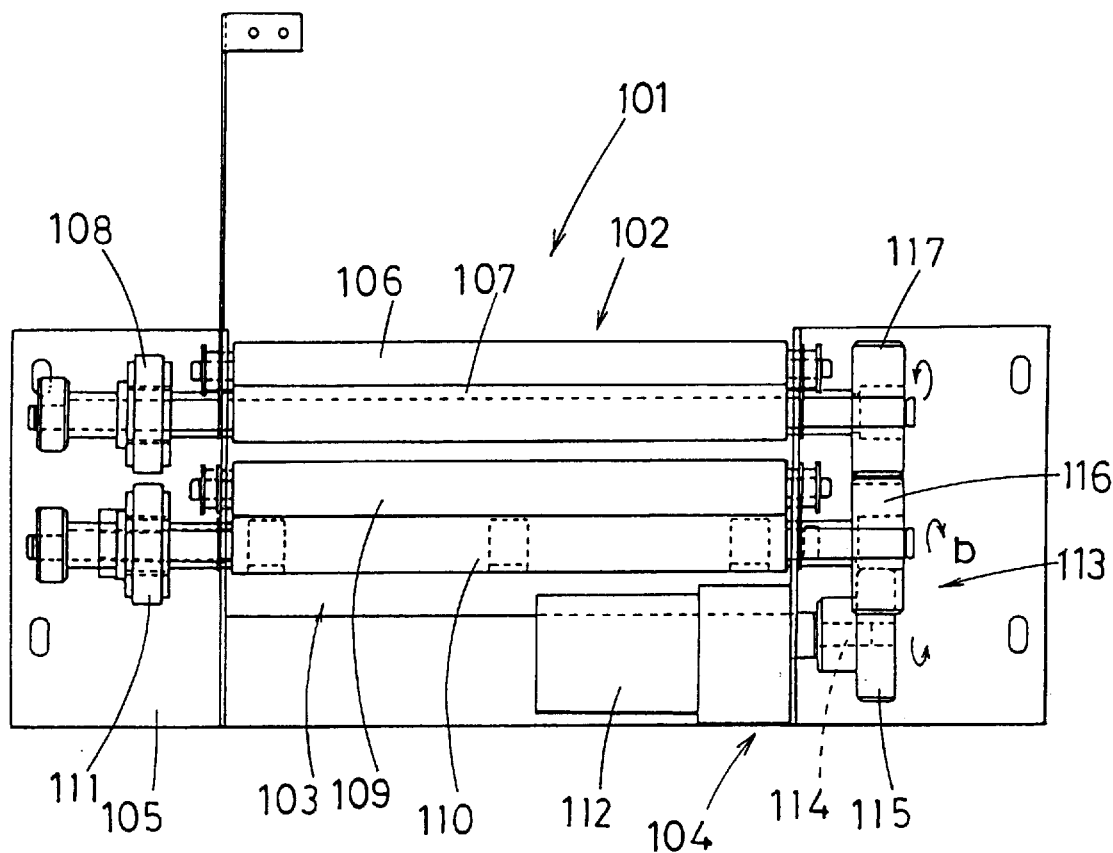
FIG. 13 is a front view of the paper feeder device of Embodiment 2, showing that a lower pair of paper feed rollers are driven in the automatic photographic processor apparatus.
Figure 14:
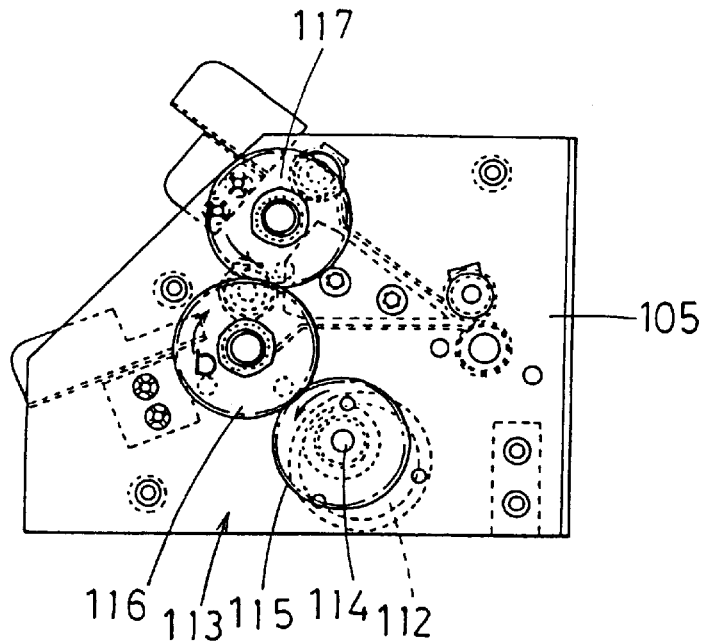
FIG. 14 is a right side view of the paper feed rollers shown in FIG. 13.
Figure 15:
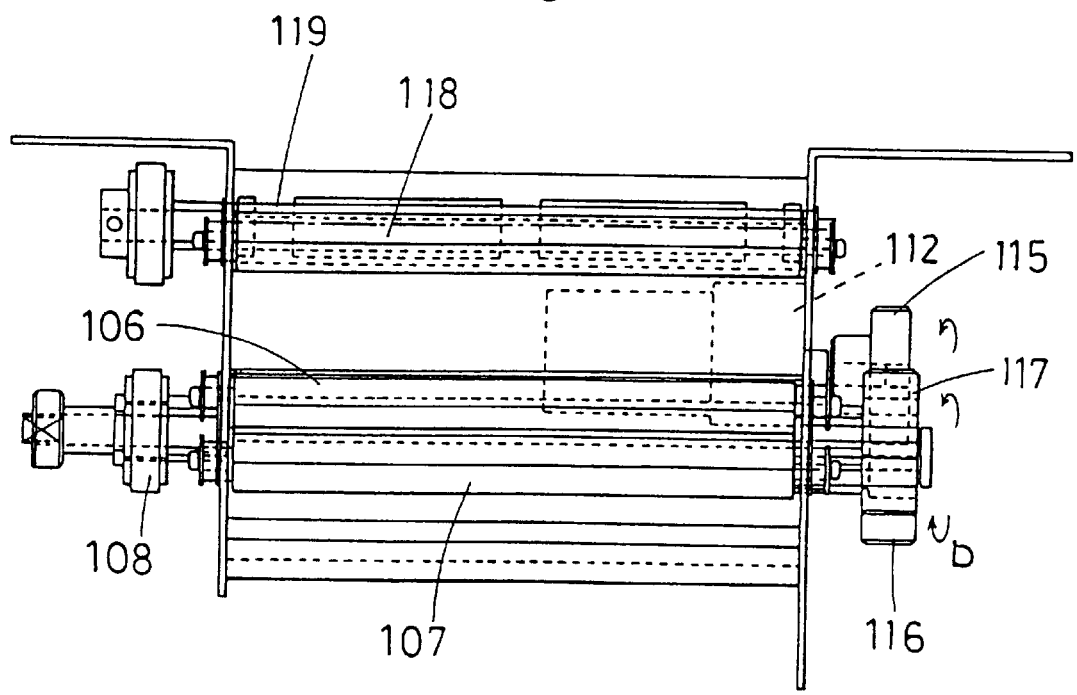
FIG. 15 is a plan view of the paper feed rollers shown in FIG. 13.
Figure 16:
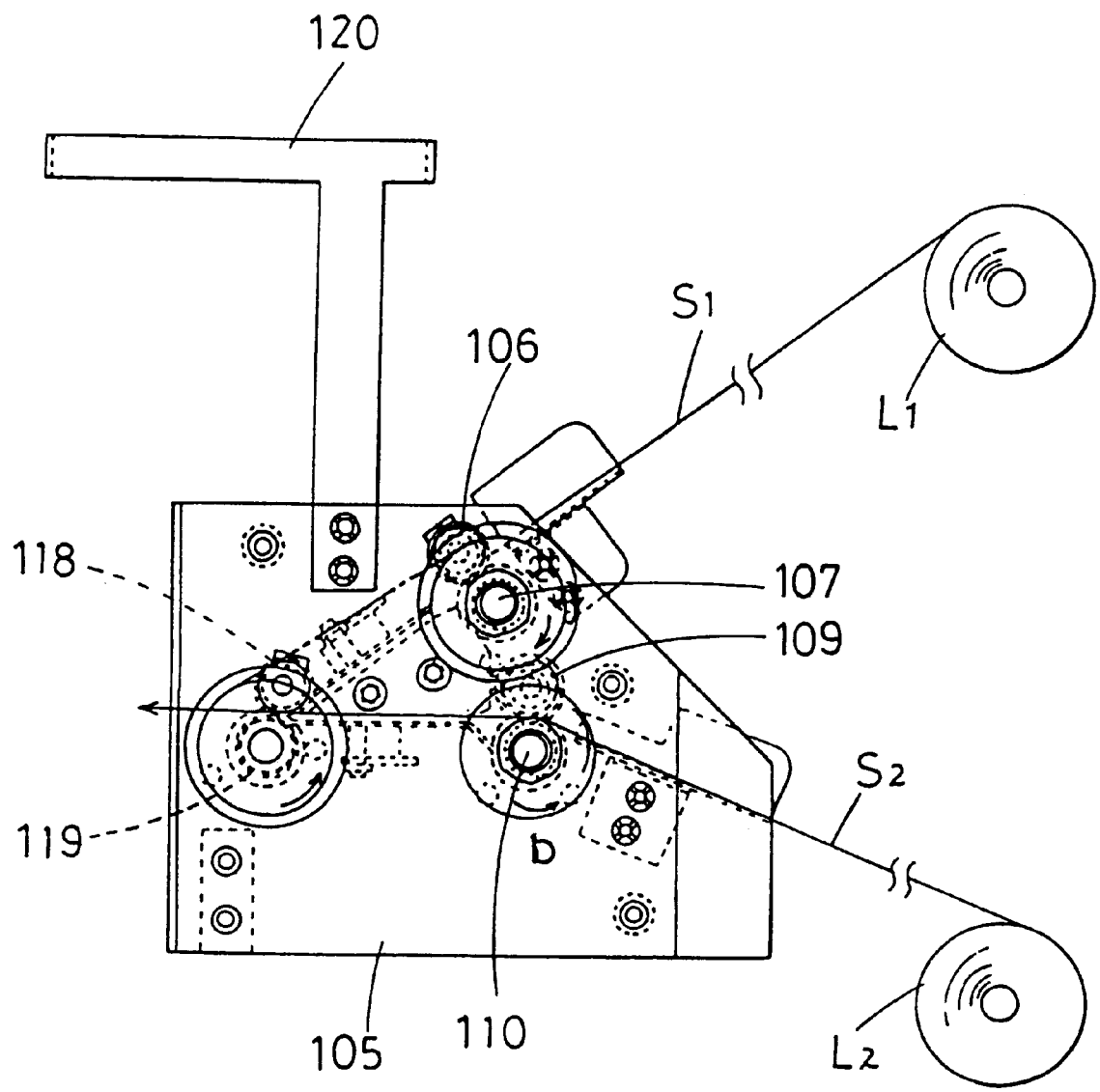
FIG. 16 is a left side view of the paper feed rollers shown in FIG. 13.

The paper feeder device 101 comprises two paper feeding means 102 and 103, a driving means 104, and other components, as best shown in FIG. 9. Each of the paper feeding means 102 and 103 includes paper feed rollers and one-way clutches. The driving means 104 consists mainly of a motor and a plurality of toothed wheels. As the paper feeding means 102 and 103 are driven by the driving means 104, the printing paper is released from its roll.

More specifically, a pair of paper feed rollers 106 and 107 are rotatably mounted to a support base 105 as shown in FIGS. 9 to 12. The two paper feed rollers 106 and 107 are arranged in direct contact with each other at their outer surfaces. One-way clutch 108 is mounted adjacent to one end of the paper feed roller 107 (specific one of the two rollers) so that the paper feed roller 107 when rotated in a direction denoted by arrow a is shifted to a locked state by the action of the one-way clutch 108 for creating a driving force. The driving force allows a sheet of printing paper S1 to be drawn from its roll L1 (FIG. 12) and conveyed between the two paper feed rollers 106 and 107.

Another pair of paper feed rollers 109 and 110 are rotatably mounted to the support base 105 beneath the paper feed roller 107. While the two paper feed rollers 109 and 110 are similar in construction to the higher paper feed rollers 106 and 107, a one-way clutch 111 is mounted adjacent to the paper feed roller 110 (specific one of the two paper feed rollers). As the paper feed roller 110 is rotated in a direction denoted by arrow b in FIGS. 13 to 16, it creates a driving force due to the action of the one-way clutch 111. Accordingly, a sheet of printing paper S2 is drawn from its roll L2 (FIG. 12) and transferred between the two paper feed rollers 109 and 110.

When the paper feed rollers 107 and 110 are rotated in reverse directions, they are unlocked to turn freely by the action of their respective one-way clutches 108 and 111, allowing the paper sheets S1 and S2 not to be conveyed.

As shown in FIGS. 9 to 12 (and FIGS. 13 to 16), motor 112 and toothed wheels 113 of the driving means for the paper feed rollers 107 and 110 are located at one side of the support base 105. More particularly, the motor 112 is mounted to a lower end of the support base 105. The motor 112 has a drive shaft 114 thereof on which a toothed wheel 115 is fitted. The toothed wheel 115 is engaged with a toothed wheel 116 mounted to one end of the paper feed roller 110. The toothed wheel 116 is then engaged with a toothed wheel 117 mounted to one end of the paper feed roller 107. Accordingly, as the motor 112 drives the toothed wheels 115, 116, and 117 the paper feed rollers 107 and 110 are rotated in opposite directions.

There are also provided two guide pulleys 118 and 119 for guiding the forward movement of the paper sheets S1 and S2 through the paper feed rollers 107 and 110, as shown in FIGS. 12 to 16. More specifically, the two guide pulleys 118 and 119 are arranged to direct forwardly either of the paper sheets S1 and S2 driven by the paper feed roller 107 or 110, whichever is in service.

Figure 17:
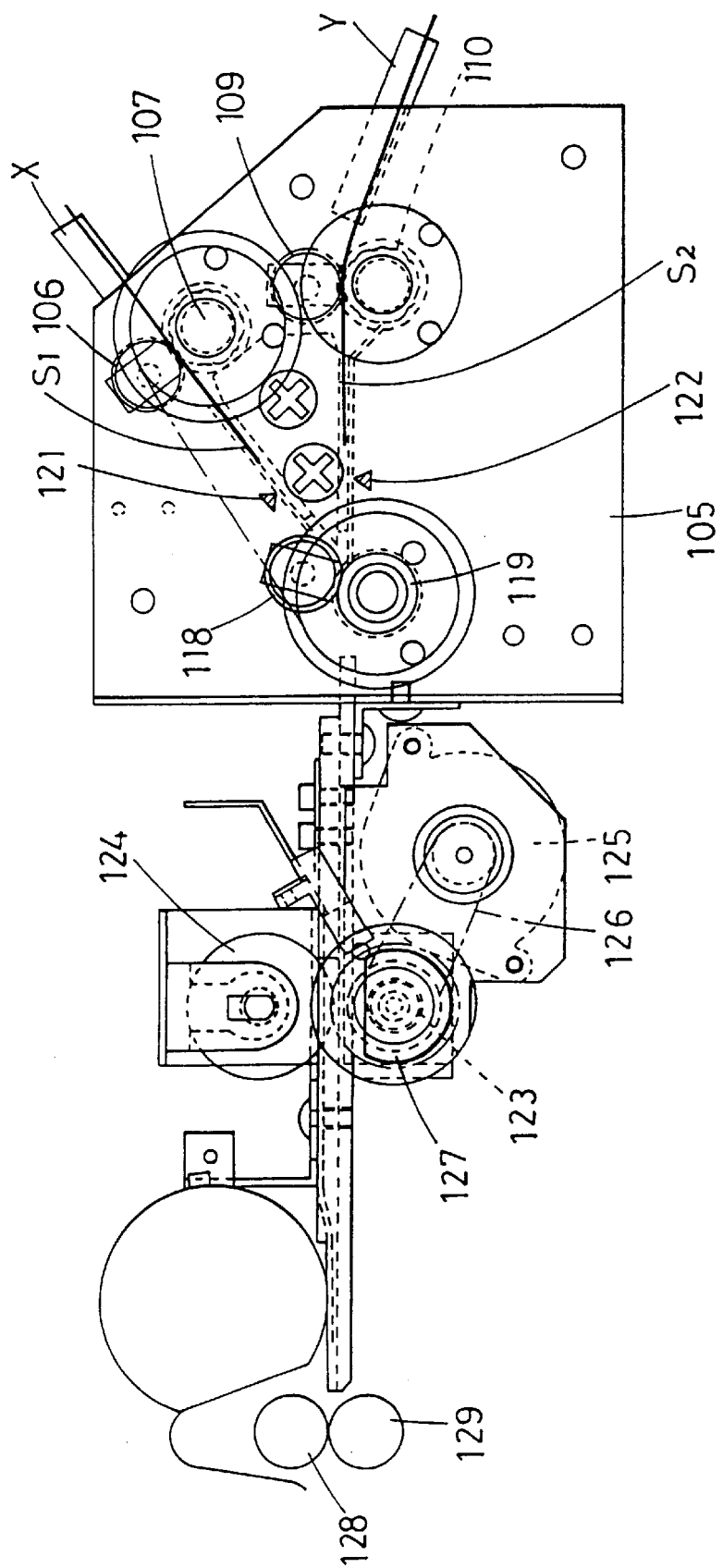
FIG. 17 is an explanatory view showing a step 1 of the paper conveying operation of the paper feeder device of Embodiment 2.

A loop sensor 120 is provided for detecting a loop form of the paper sheet S1 (or S2) which is produced after passing the guide pulleys 18 and 19 and will be explained later in detail. Also, overfeed sensors 121 and 122 are mounted before the guide pulleys 118 and 119 for detecting inadequate behaviors of the paper sheets S1 and S2 respectively forwarded from the paper feed rollers 107 and 110, as shown in FIG. 17.

A combination of a drive shaft 123 and a hold-down roller 124 is mounted for forwarding the paper sheet S1 (or S2) passed between guide pulleys 118 and 119. The drive shaft 123 is linked by a belt 126 (or a chain) to a motor 125. Accordingly, as the motor 125 rotates, a half roller 127 the periphery of which is partially flattened is turned one full revolution to forward the paper sheet S1 (or S2). A pair of grip rollers 128 and 129 are provided for causing the paper sheet S1 (or S2) to pause before being transferred further.

In common, the paper feeder device 101 in the automatic photographic processor apparatus allows two rolls L1 and L2 of the printing paper to be stored in place (not shown). An upper paper sheet S1 from its roll L1 (FIG. 12) is forwarded between the paper feed rollers 106 and 107 mounted to the support base 105, as shown in FIG. 17. Simultaneously, another paper sheet S2 from its roll L2 (FIG. 12) is conveyed between the paper feed rollers 109 and 110.

For feeding the upper paper sheet S1, the motor 112 is turned on to rotate the toothed wheel 115 in the (forward or reverse) direction denoted by the arrow in FIGS. 9 to 12. In response, the toothed wheel 116 of the paper feed roller 110 and the toothed wheel 117 of the paper feed roller 107 are rotated in their corresponding directions.

As the rollers rotate, the one-way clutch 108 on the paper feed roller 107 mounted to the upper portion of the support base 105 is activated thus to transfer the paper sheet S1 of the upper roll L1.

At such time, the one-way clutch 111 on the paper feed roller 110 mounted to the lower of the support base 105 remains idle allowing the paper sheet S2 of the lower roll L2 to pause.

When the upper roll L1 (FIG. 12) is consumed, the motor 112 rotates systematically in the reverse direction to rotate the toothed wheels 115, 116, and 117 in the directions denoted by the arrows in FIGS. 13 to 16.

Accordingly, the one-way clutch 111 on the paper feed roller 110 mounted to the lower portion of the support base 105 is activated to transfer the lower paper sheet S2. Meanwhile, the one-way clutch 108 on the paper feed roller 107 mounted to the upper portion of the support base 105 remains idle. Then, an unused roll is loaded at the upper side for allowing the automatic photographic processor apparatus to run continuously without any down time.

The feeding of the upper paper sheet S1 will be explained referring to FIGS. 17 to 23. As shown in FIG. 17, the operation starts with (manually) forwarding the paper sheets S1 and S2 from their respective rolls L1 and L2 (FIG. 12) to two, upper and lower, paper inlets X and Y respectively to positions such that the overfeed sensors 121 and 122 do not detect the paper.

Figure 18:
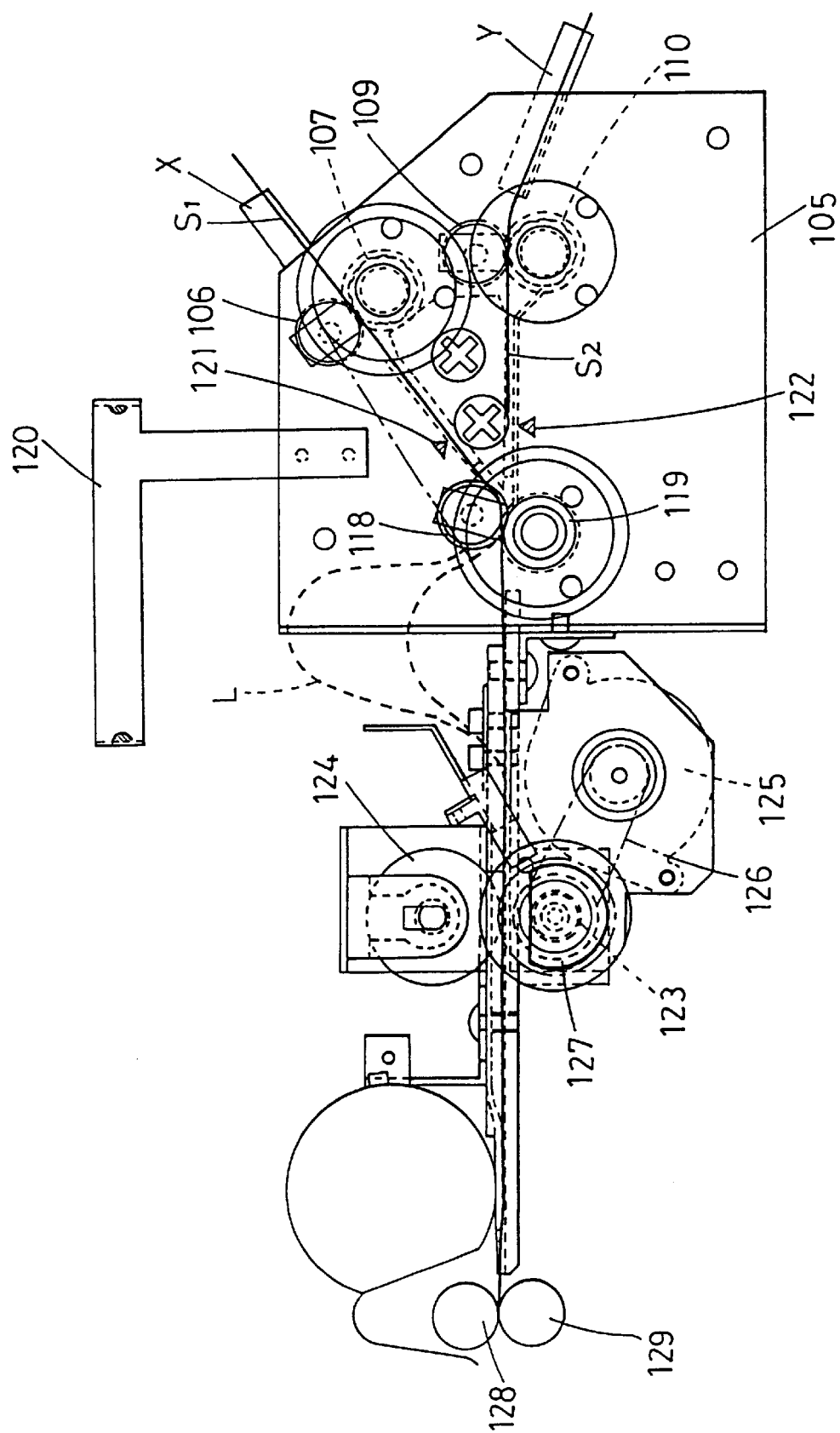
FIG. 18 is an explanatory view showing a step 2 of the paper conveying operation of the paper feeder device of Embodiment 2.

The upper paper sheet S1 is preferentially conveyed by the paper feeding means 102 and the driving means 104 which are electrically controlled until its leading end reaches the grip rollers 128 and 129 as shown in FIG. 18. Meanwhile, the feeding of the paper sheet S1 from its roll L1 (FIG. 12) is continued so that a loop L is produced between the guide pulleys 118, 119 and the drive shaft 123.

Figure 19:
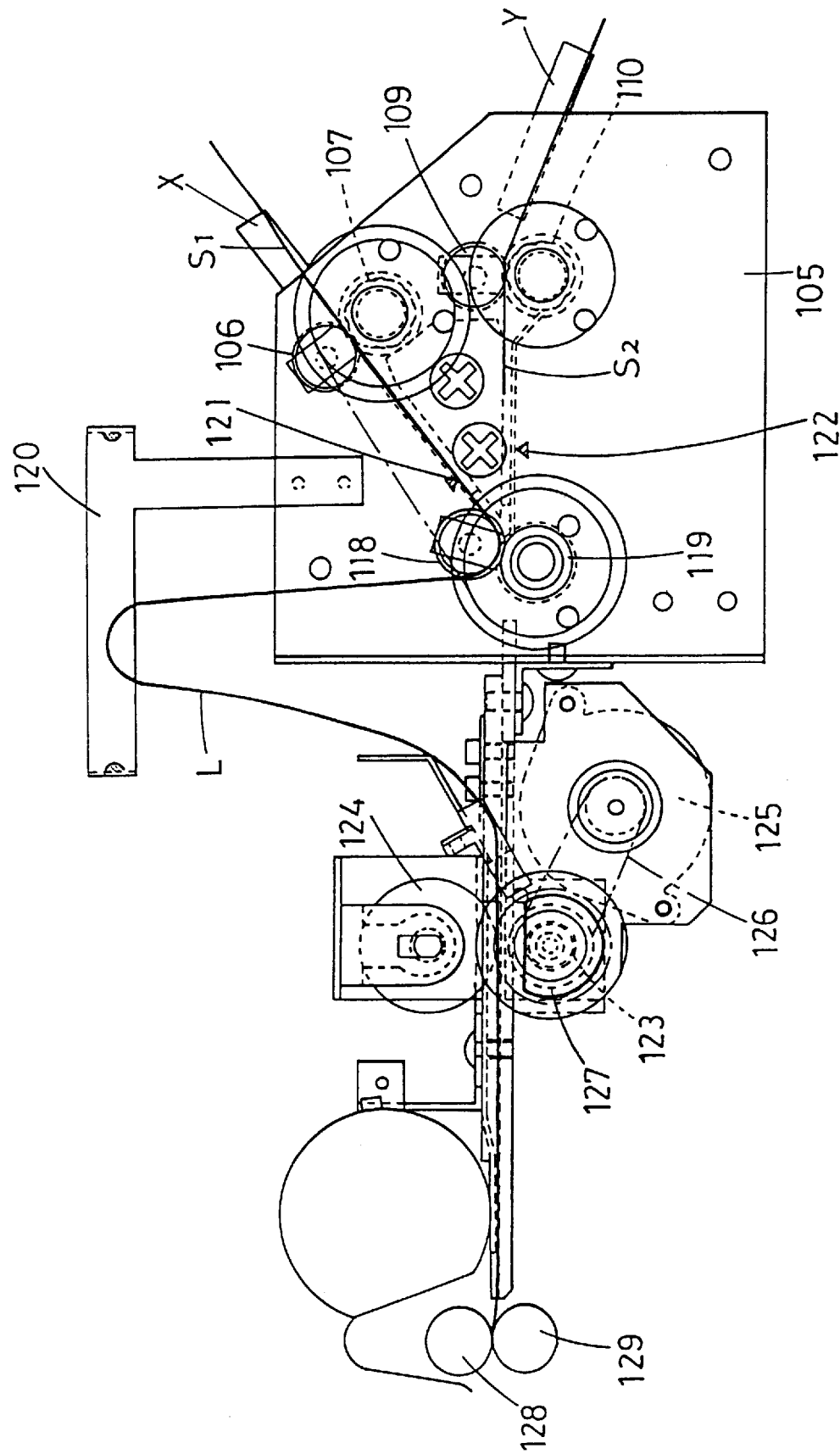
FIG. 19 is an explanatory view showing a step 3 of the paper conveying operation of the paper feeder device of Embodiment 2.

When the loop L becomes large as shown in FIG. 19, it is detected by the loop sensor 120 and the feeding of the paper sheet S1 is halted.

Figure 20:
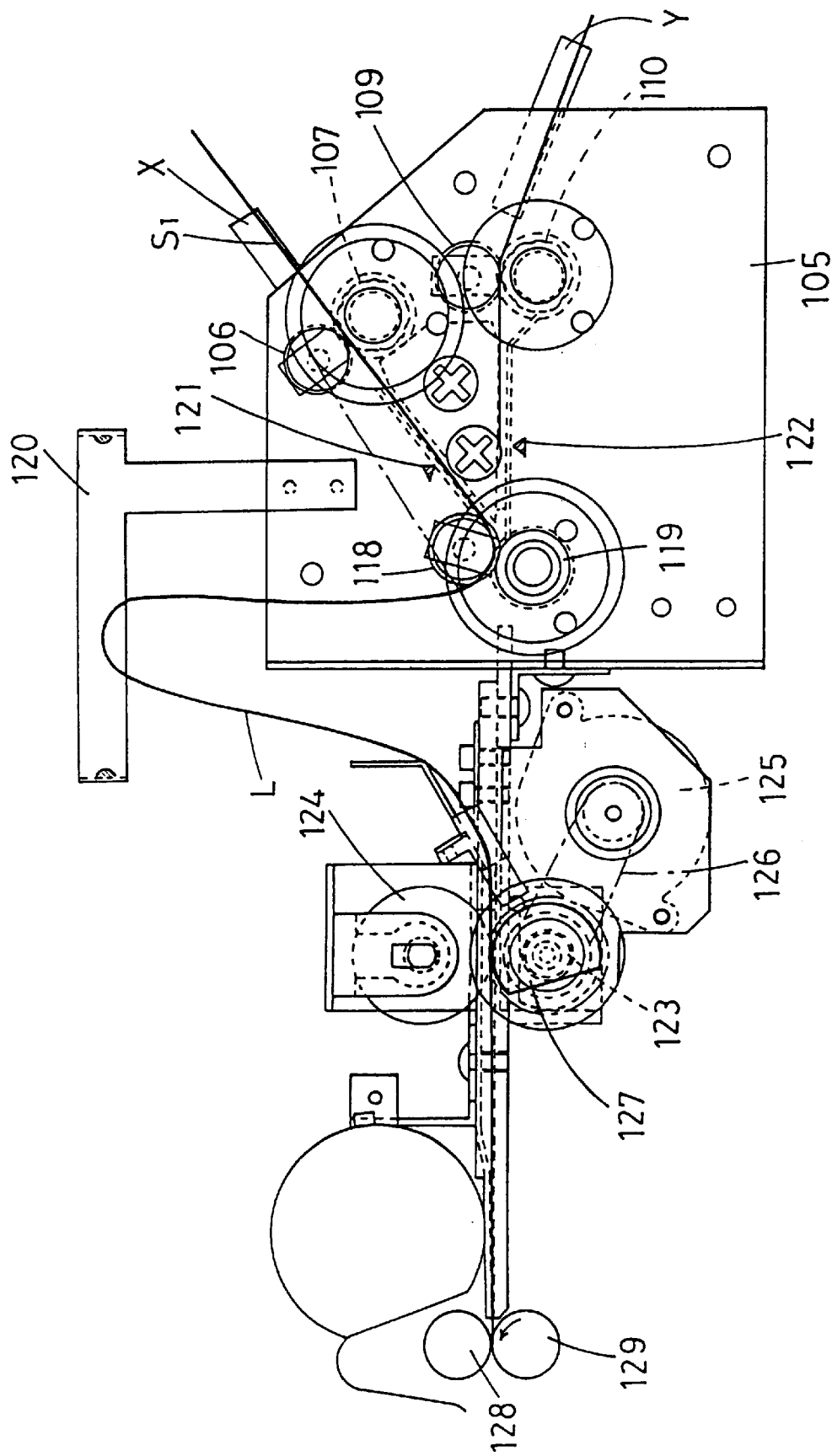
FIG. 20 is an explanatory view showing a step 4 of the paper conveying operation of the paper feeder device of Embodiment 2.

The drive shaft 123 is then turned to its original position just before the grip roller 129 starts rotating as shown in FIG. 20. This allows the paper sheet S1 to be gripped between the half roller 127 and the hold-down roller 124 and thus transferred correctly to between the grip rollers 128 and 129.

Figure 21:
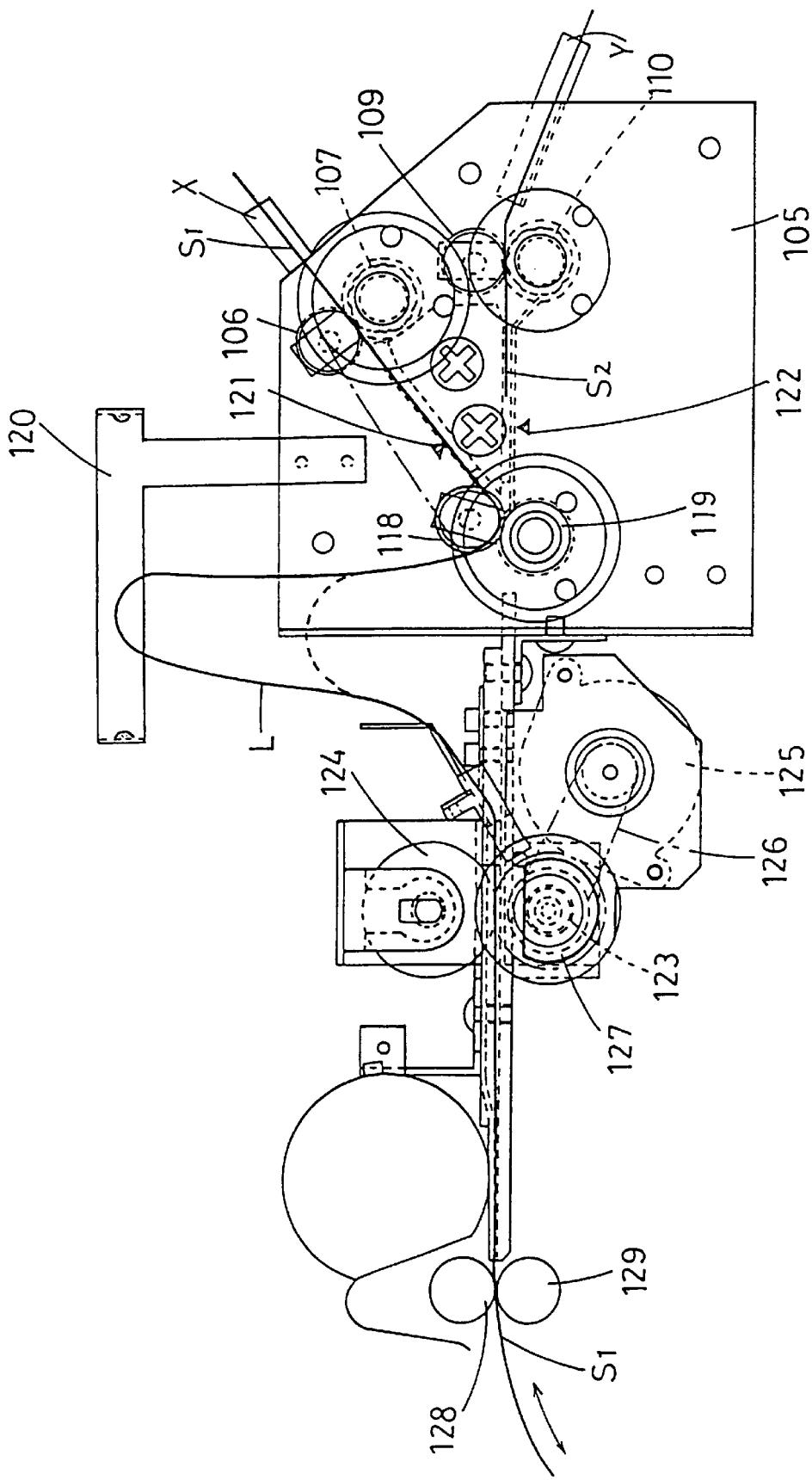
FIG. 21 is an explanatory view showing a step 5 of the paper conveying operation of the paper feeder device of Embodiment 2.
Figure 22:
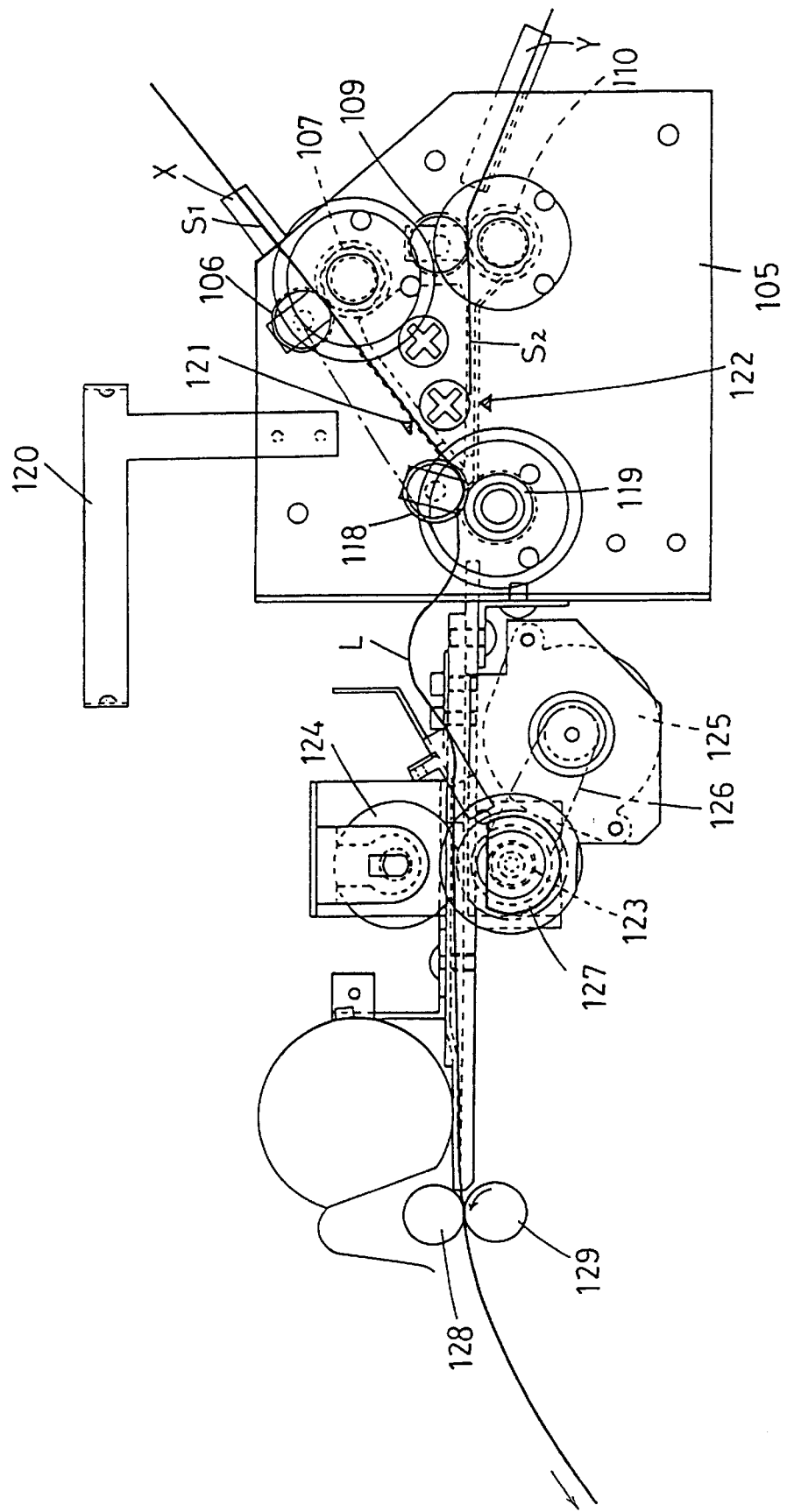
FIG. 22 is an explanatory view showing a step 6 of the paper conveying operation of the paper feeder device of Embodiment 2.

Referring to FIG. 21, as the paper sheet S1 is further conveyed, a printing operation starts. During the printing operation, the loop L is varied in size.

After the printing operation is completed, the paper sheet S1 is cut off at the forward side of the grip rollers 128 and 129. Meanwhile, the loop L becomes minimum in size.

Figure 23:
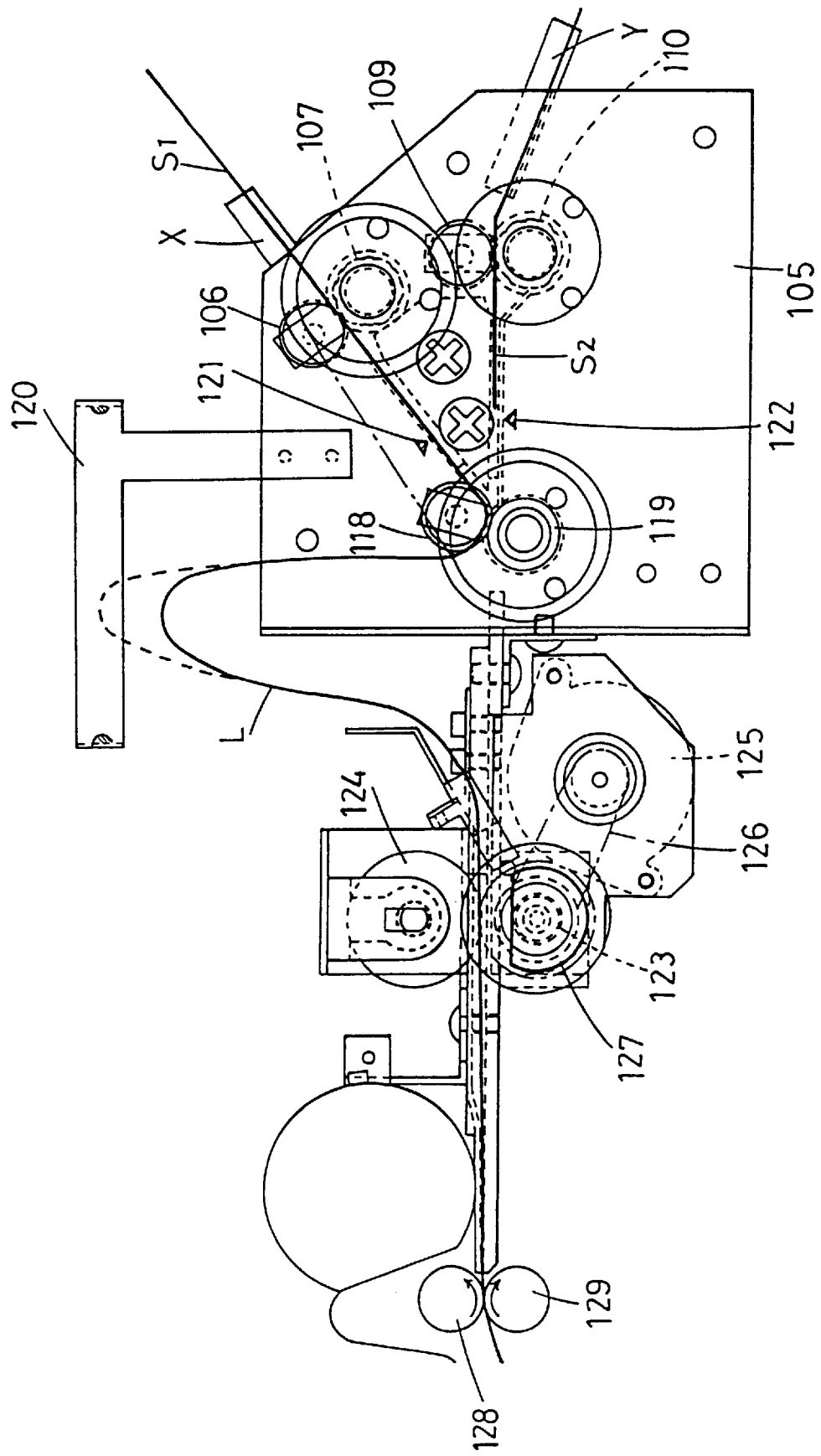
FIG. 23 is an explanatory view showing a step 7 of the paper conveying operation of the paper feeder device of Embodiment 2.

Upon the cutting operation being finished, the remaining paper sheet S1 is withdrawn from the grip rollers 128 and 129 as shown in FIG. 23. If the loop L remains too small to be detected by the loop sensor 120, the paper sheet S1 is further fed from its roll L1 until the loop sensor 120 produces a detection signal.

When the upper roll L1 (FIG. 12) is consumed, the feeding is switched to the lower roll L2. By repeating the above operation, the paper sheet S2 is conveyed forward. As described, the sheet of thermal transfer or printing paper is driven by the paper feeder device 101 and passed through the automatic photographic processor apparatus which in turn conducts exposure and development operations to produce a series of photographic prints.

It will be understood that the paper feeder device of Embodiment 2 may successfully be used in a ticket machine or a register machine.

Embodiment 3

Figure 24:
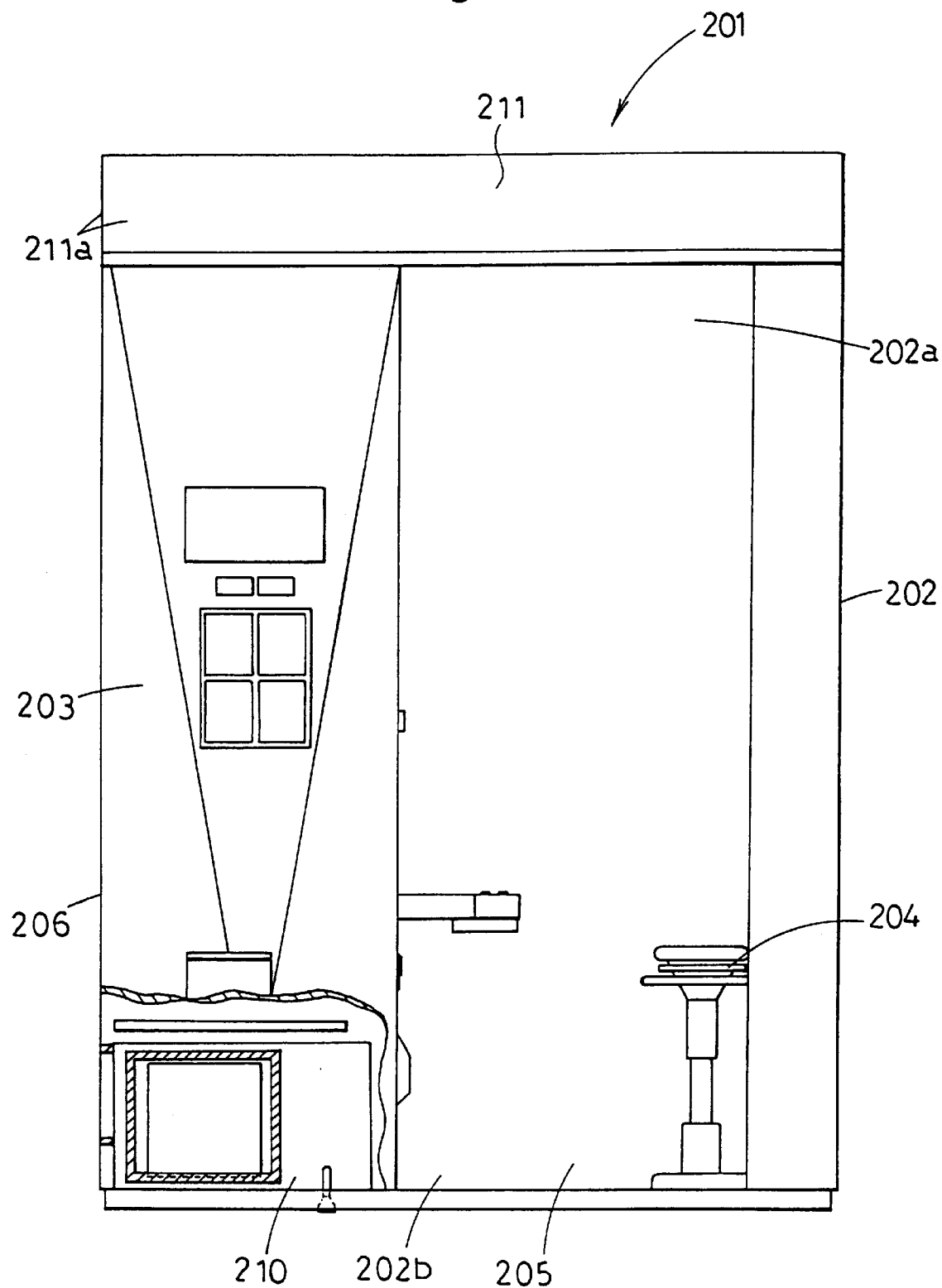
FIG. 24 is a partially cross sectioned front view of an outdoor installation booth for an automatic photographic processor apparatus showing Embodiment 3 of the present invention.
Figure 25:
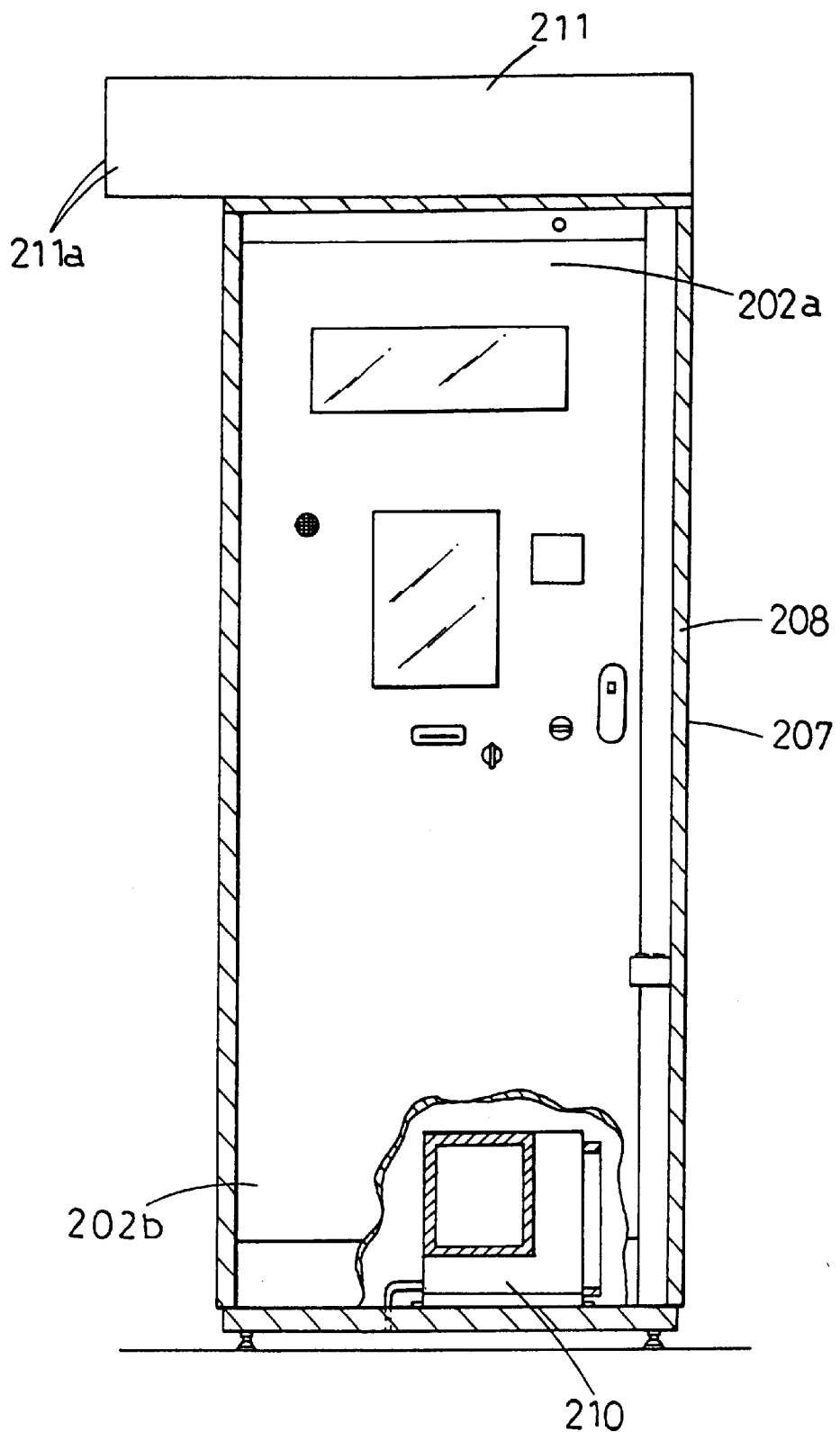
FIG. 25 is a partially cross sectioned side view of the outdoor installation booth for an automatic photographic processor apparatus of Embodiment 3.
Figure 26:
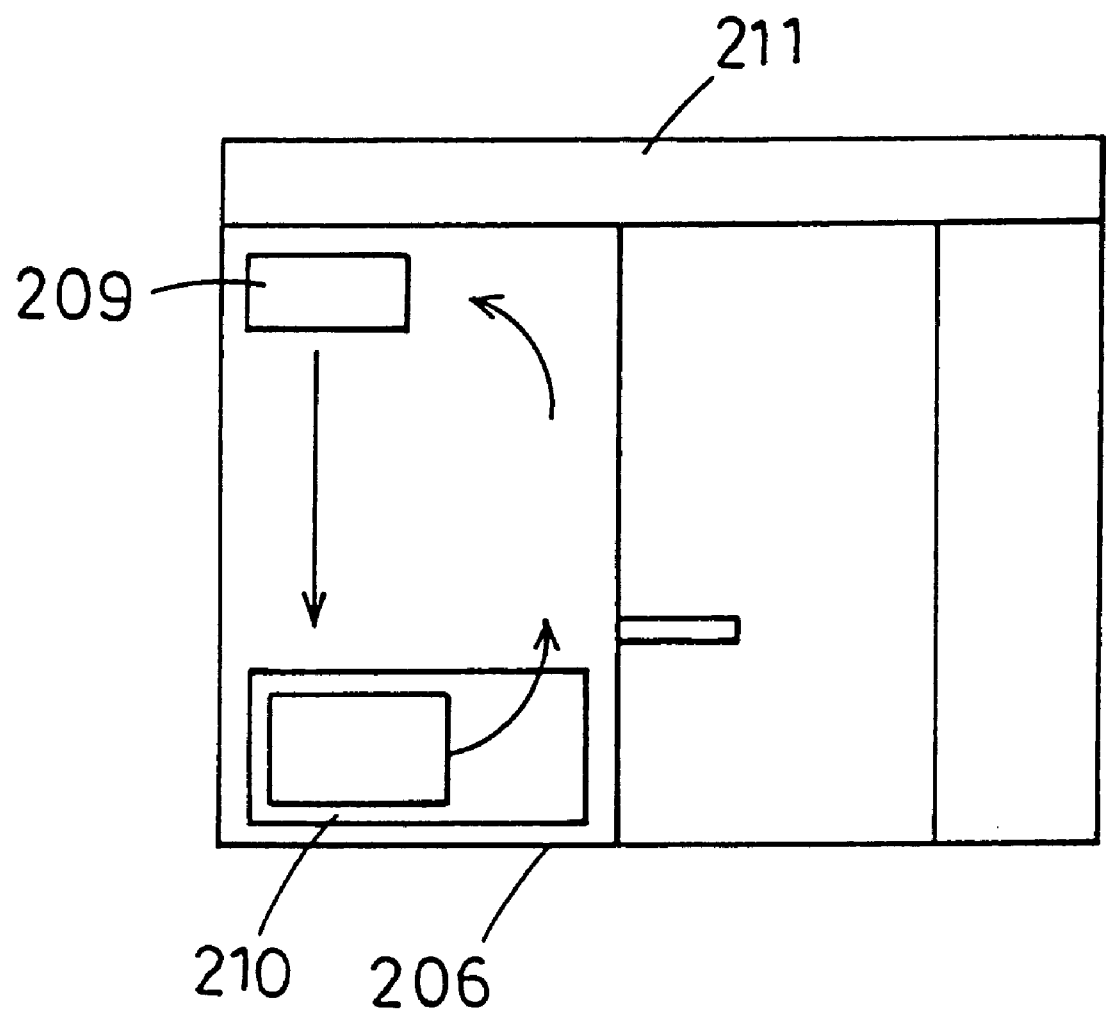
FIG. 26 is a schematic front view of the outdoor installation booth for an automatic photographic processor apparatus of Embodiment 3.

Embodiment 3 of the present invention will be described referring to FIGS. 24 to 26. Embodiment 3 relates to an outdoor installation housing or booth for an automatic photographic processor apparatus of the present invention.

As shown, the outdoor installation booth 201 for an automatic photographic processor apparatus has an overall shape of a rectangular parallelepiped, in which an automatic photographic processor apparatus 203 is installed in a booth shell 202. Also, a bench 204 is placed opposite to and at a distance from the automatic photographic processor apparatus 203. The automatic photographic processor apparatus 203 can be operated by a client who is seated on the bench 204 for taking an image of himself or herself.

The booth shell 202 has an entrance opening 205 in one side thereof for easy access of the client to the automatic photographic processor apparatus 203 and its other sides are enclosed by walls 206. Each wall 206 is made of metal sheets 207 and a closed-cell foam type thermal insulating material 208. More specifically, the metal sheets 207 are arranged to cover the entire wall 206 and are bonded at their inner sides to the closed-cell foam type thermal insulating material 208. Joints between the metal sheets 207 are filled with a sealant.

The booth shell 202 also has a top side 202a and a bottom side 202b of the same construction as the walls 206 or of other ceiling and floor materials respectively.

A ventilation fan 209 is mounted to the inner side of the booth shell 202 above the automatic photographic processor apparatus 203. Also, an air-conditioner 210 of a small size is provided beneath the ventilation fan 209. The air-conditioner 210 delivers a flow of cool air towards the ventilation fan 209 which blows downwardly warm air stagnated above in the booth. Accordingly, the air is circulated about the automatic photographic processor apparatus 203 which thus stays in an optimum temperature condition. The automatic photographic processor apparatus 203 includes a digital image processor (not shown) which is preferably located in a lower region of the automatic photographic processor apparatus 203 where the temperature is relatively low.

A lighted signboard 211 is mounted on the top of the booth shell 202. The lighted signboard 211 is larger in plan area than the top of the booth shell 202 and has a square hollow construction in which a lighting appliance is installed for illuminating characters or pictures provided on an outer side 211a of the lighted signboard 211 for advertising purposes.

As the lighted signboard 211 is mounted on the top of the booth shell 202 forming a double roof arrangement, the booth shell 202 is prevented from being directly exposed to sunlight and will have an increased thermal insulating effect.

Embodiment 4

Embodiment 4 of the present invention will now be described referring to FIGS. 27 to 30. Embodiment 4 relates to an object image capturing mechanism in the automatic photographic processor apparatus of the present invention.

Figure 29:
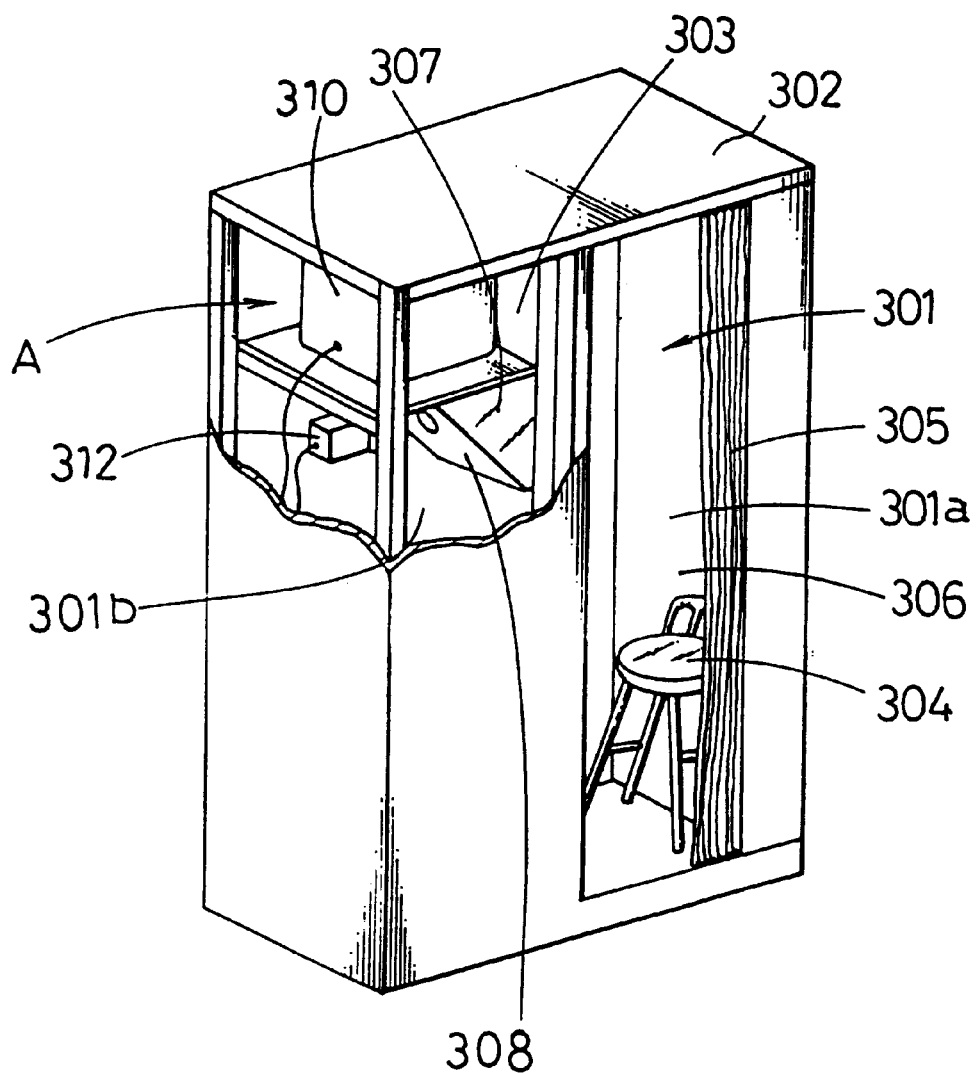
FIG. 29 is a partially cut-away perspective view of the automatic photographic processor apparatus according to Embodiment 4.
Figure 30:
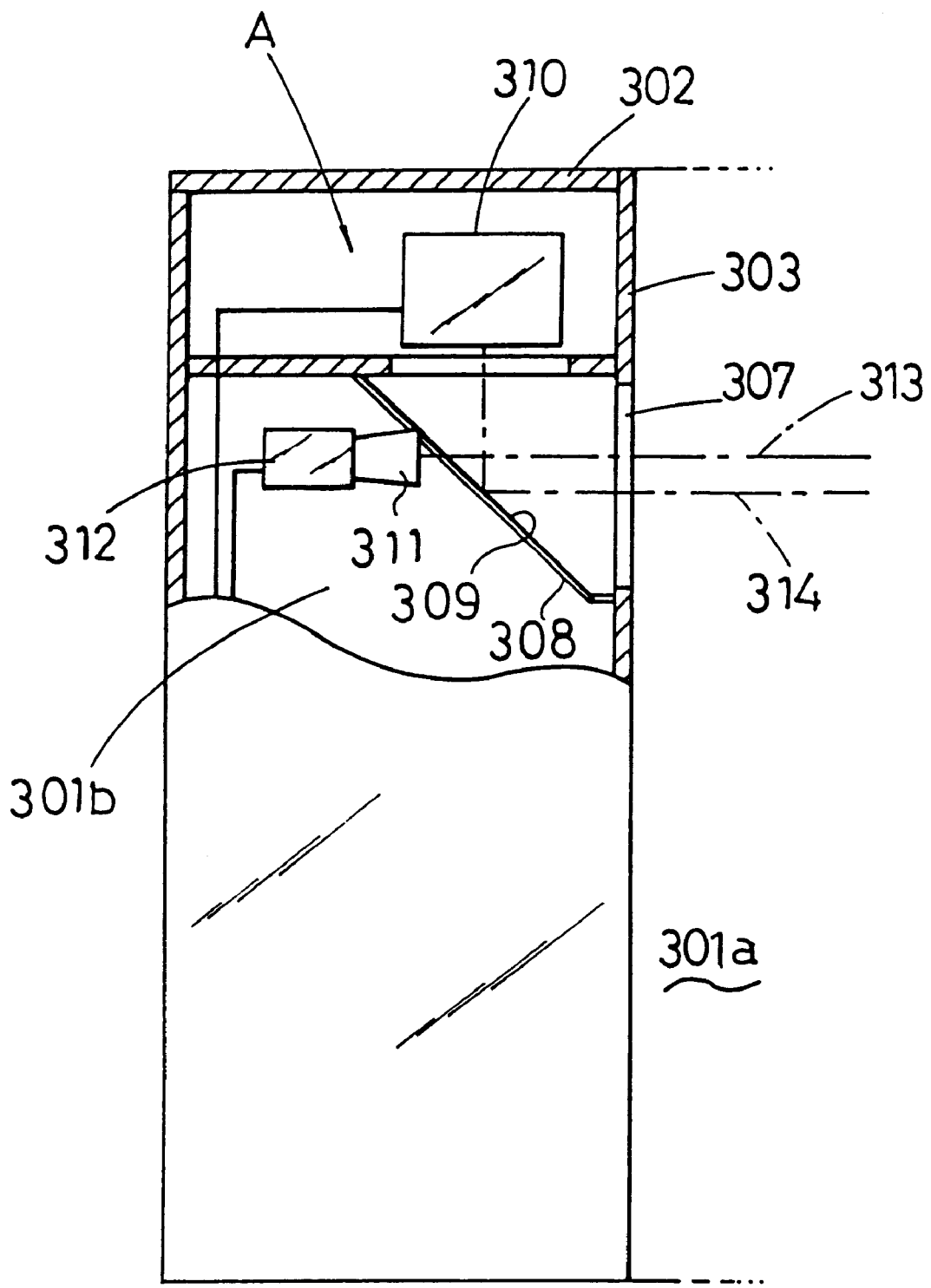
FIG. 30 is a schematic explanatory view of Embodiment 4 showing a primary region in cross section.
Figure 31:
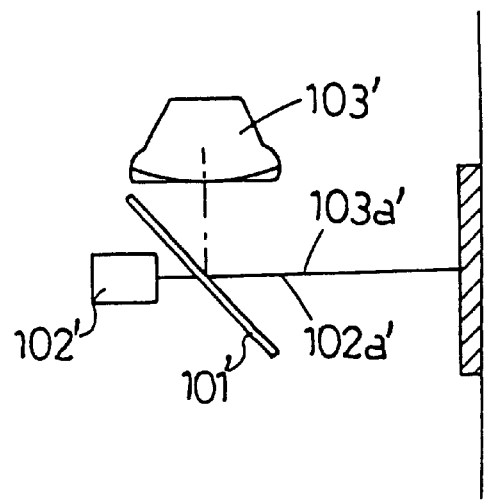
FIG. 31 is a schematic explanatory view of a prior art mechanism related to an object image capturing mechanism in a known automatic photographic processor apparatus.
Figure 32:
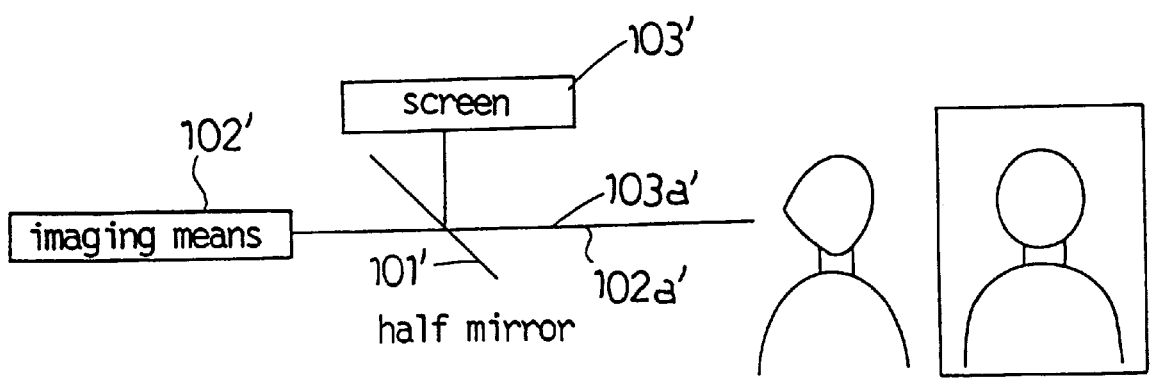
FIG. 32 is a schematic explanatory view of another prior art mechanism related to the object image capturing mechanism in the known automatic photographic processor apparatus.

As shown in FIGS. 29 and 30, a booth 302 of a rectangular parallelepiped shape has an interior space 301 which is divided by a center partition 303 into two areas 301a and 301b. A stool 304 is provided in the area 301a for allowing a client to be seated. One side of the area 301a in the booth 302 has an entrance opening 306 therein provided with a curtain 305 for closing opening 306.

The other area 301b in the booth 302 contains the object shooting mechanism A of this embodiment for taking an image of an object or client, a central processing unit (not shown) for processing an image, and a photographic processor (not shown). The partition 303 has a window 307 provided therein opposite to the client who is seated on the stool 304 facing the front (towards the space 301b). The booth 302 may be arranged in any other appropriate shape.

The object image capturing mechanism A in the automatic photographic processor apparatus comprises a half mirror 308, a monitor 310, and a camera 312 mounted in an upper region of the area 301b. The half mirror 308 is spaced by a distance from the window 307. More specifically, the half mirror 308 is arranged with its reflecting surface 309 tilted at an angle of 45 degrees to the window 307, as shown in FIG. 30.

Also, the monitor 310 is disposed above the half mirror 308 so that it faces at 45 degrees to the reflecting surface 309 of the half mirror 308. An image displayed on the monitor 310 is viewed by the client for confirmation and is reflected 90 degrees on the reflecting surface 309 of the half mirror 308.

The camera 312 is disposed behind the half mirror 308 so that its lens 311 faces the client through the window 307. In particular, the camera 312 is offset by 10 to 20 mm towards the monitor 310 from the optical axis 314 of the monitor 310 extending after being reflected on the half mirror 308, preventing optical axis 313 from overlapping the optical axis 314 of the monitor 310.

Figure 27:
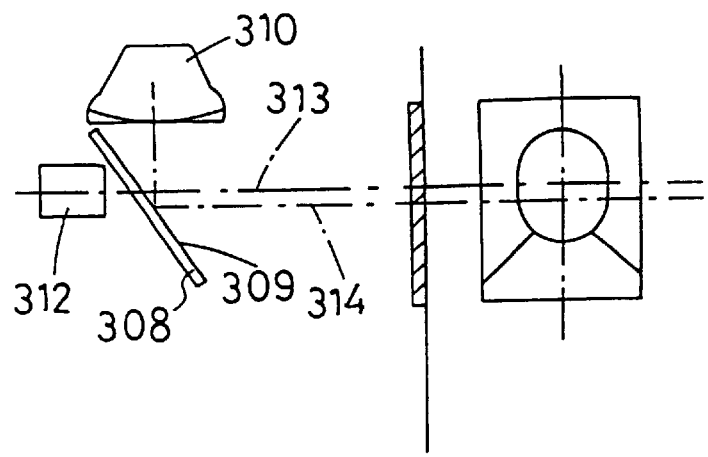
FIG. 27 is a schematic explanatory view of an object image capturing mechanism in an automatic photographic processor apparatus showing Embodiment 4 the present invention.
Figure 28:
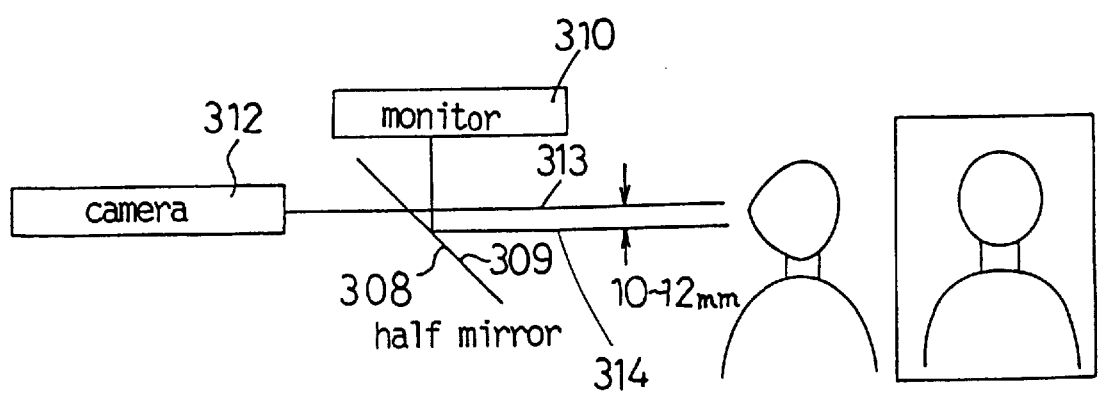
FIG. 28 is an explanatory view of a primary part of the object image capturing mechanism of Embodiment 4.

As shown in FIGS. 27 and 28, the dislocation or offset of the optical axis 313 of the camera 312 from the optical axis 314 of the monitor 310 allows the eyes of the client who is seated on the stool 304 and facing the front (towards the window 307) to meet the optical axis 313 of the camera 312. Accordingly, the image of the client will be taken directly from the front. Simultaneously, the client can view an image of his or her face displayed on the monitor 310 through the half mirror 308. The image on the monitor 310 displays a straight viewing orientation of the face which is most preferred for any type of identification photograph.

Embodiment 5

Embodiment 5 of the present invention will be described referring to FIGS. 33 to 36. Embodiment 5 relates to an identification photo strip with cutline markings and an automatic photographic processor apparatus for producing such strip of the present invention.

Figure 33:
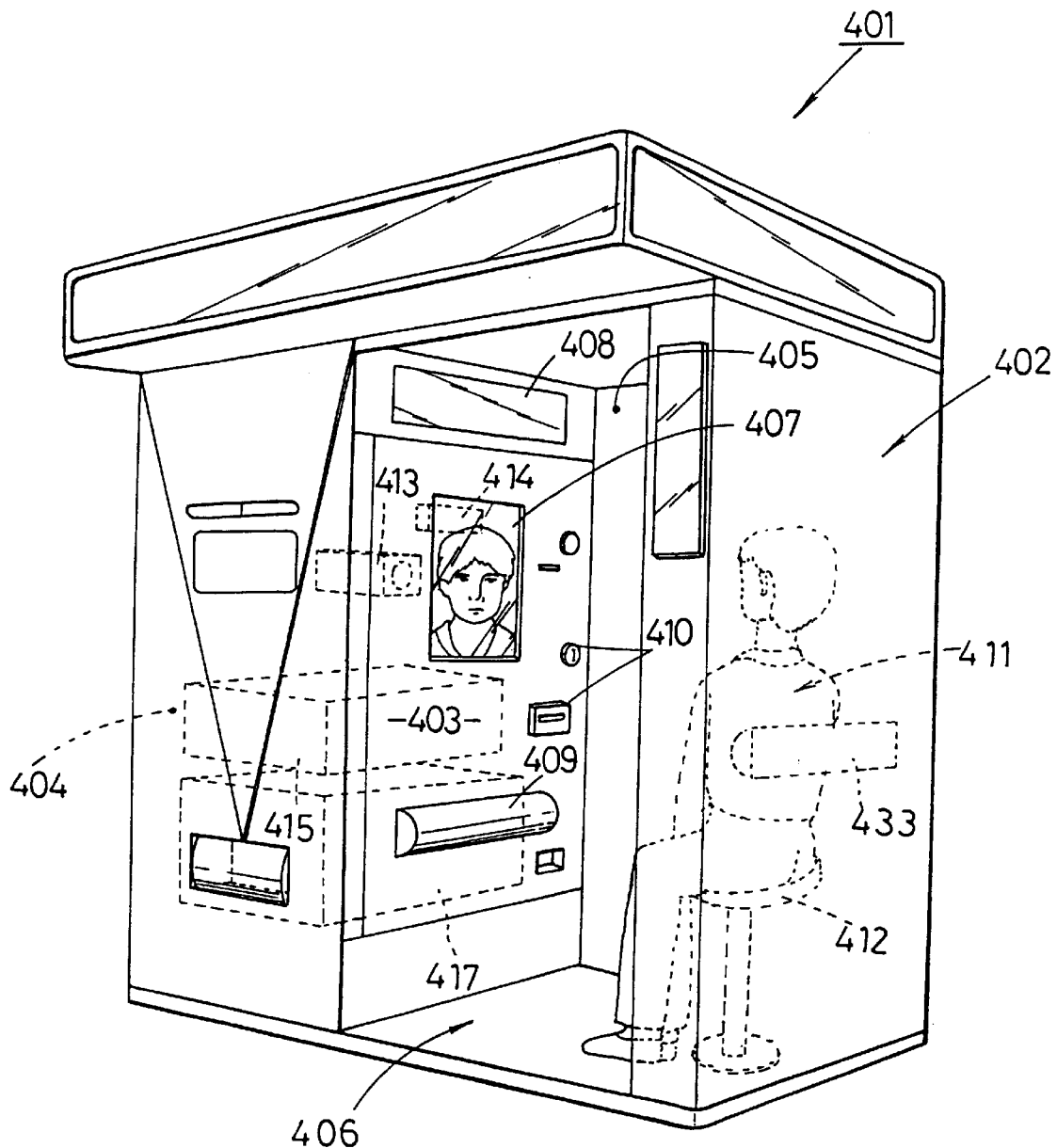
FIG. 33 is a perspective view of an automatic photographic processor apparatus for producing an identification photograph strip with cutline markings showing Embodiment 5 of the present invention.

FIG. 33 is a perspective view of an automatic photographic processor apparatus for producing the identification photo with a cutline marking, in which the numeral 401 denotes an overall arrangement of the automatic photographic processor apparatus.

The automatic photographic processor apparatus 401 for the identification photo with a cutline marking has a booth 402 of substantially box shape and divided by a partition 403 into two spaces, a machine room 404 and a shooting room 405.

The shooting room 405 has an entrance opening 406 provided in a front side thereof. The partition 403 has a window 407 provided in a central region thereof, two lighting devices 408 and 409 mounted thereon above and below the window 407 respectively, and a coin/note insertion 410 mounted thereto. There are also provided a stool 412, a back rest 433, and button-switch controls (not shown) so that an object or client 411 (who wants identification photos) faces directly the window 407 of the partition 403 when seated on the stool 412.

A video camera 413 is installed in the machine room 404 for taking an image of the client 411 seated on the stool 412 through a half mirror (not shown). The video camera 413 is a known CCD camera (an imaging means) which converts an optical image captured by an optical system of a lens and sensor to an electric signal.

Also, a visual display terminal 414 (namely CRT) for displaying the captured image and relevant instruction screens is mounted in a position which is close to the video camera 413 and thus is viewed through the window 407 by the client 411. A microcomputer 415 is mounted beneath the video camera 413 for processing data of the image transferred from the camera 413. Provided beneath the microcomputer 415 is a printer 417 for printing on an identification photo printing sheet 416 shown in FIG. 34 the image data of Y (yellow), M (magenta), and C (cyan) colors of a print format which have been converted by the microcomputer 415 from RGB signals of the three optical primary colors.

Figure 35:
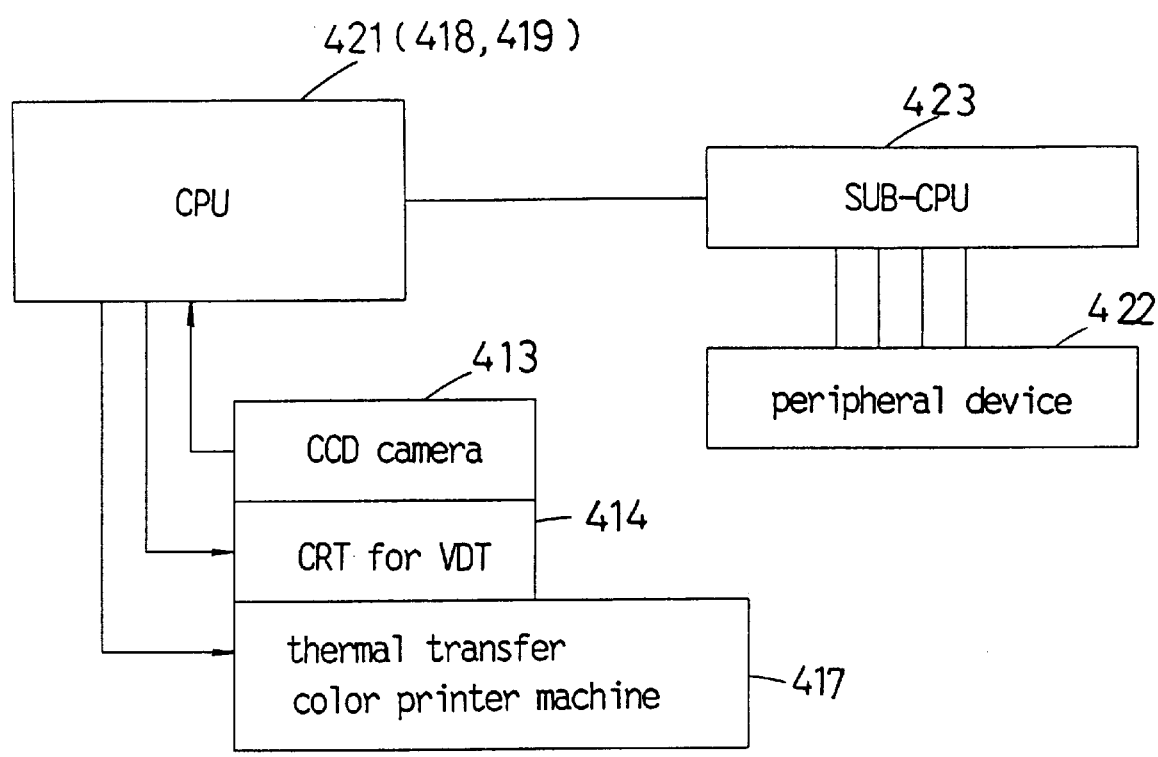
FIG. 35 is a block diagram showing the automatic photographic processor apparatus for producing an identification photograph strip with cutline markings of Embodiment 5.

The microcomputer 415 comprises, as shown in FIG. 35, a central processing unit (CPU) 421 including a calculating means 418 for converting the image data captured by the video camera 413 to a format suited for producing prints of a desired size, and an editing means 419 for, producing from the image data of the calculating means 418 a printout format of the image data accompanied with background data in which cutline markings are printed about a group of pattern photographs 420, and a sub-central processing unit (SUB-CPU) 423 for controlling a power source and other peripheral devices 422.

Figure 34:
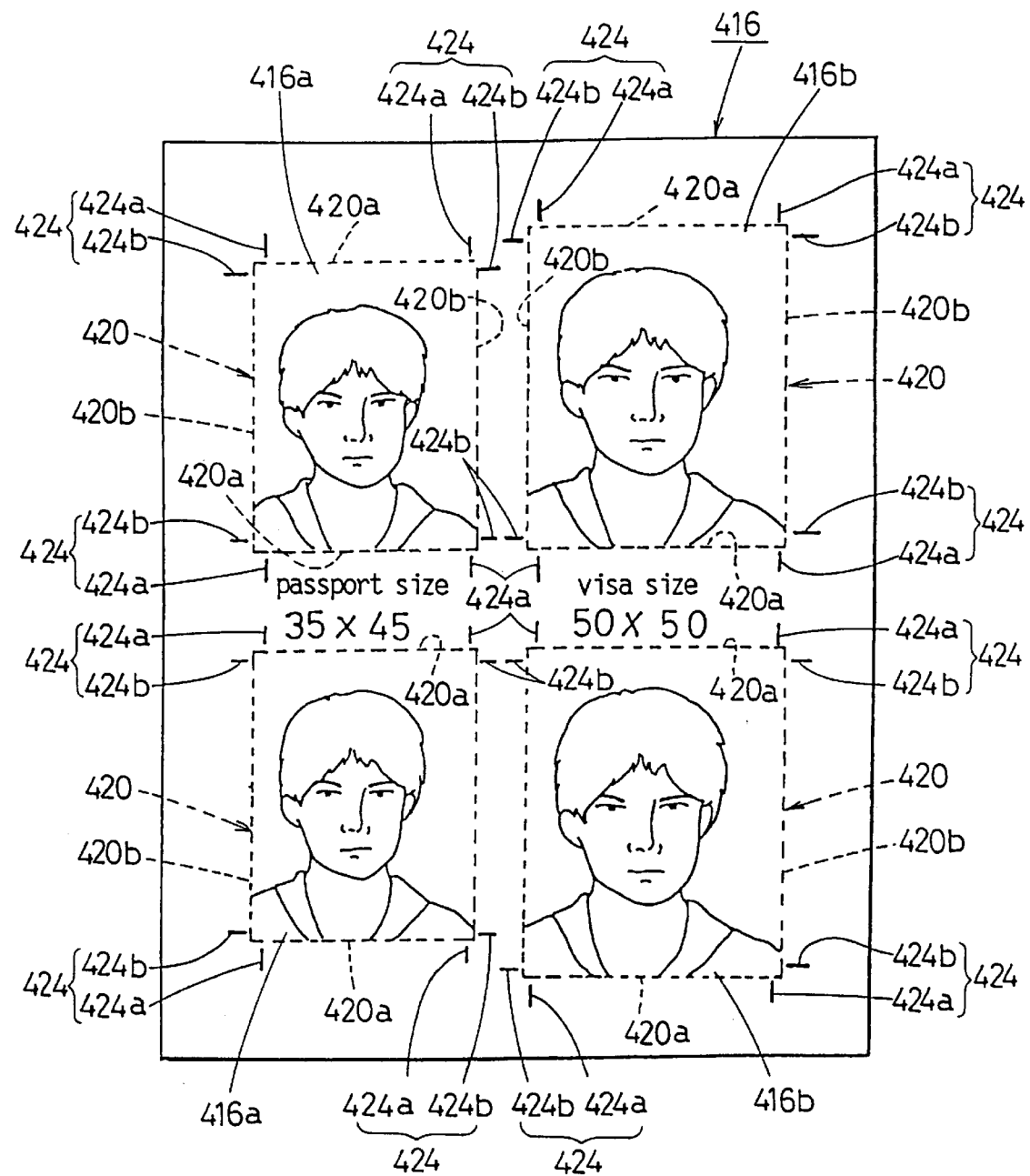
FIG. 34 is a front view of the identification photograph strip with cutline markings according to Embodiment 5.

The procedure of printing an identification photo sheet 416 for passport and visa size pictures accompanied with the cutline markings, shown in FIG. 34, with the automatic photographic processor apparatus 401 will be explained in conjunction with a flowchart of FIG. 36.

The procedure starts with specifying a desired size, e.g. passport and visa size, of identification photographs. The client is seated on the stool 412 to face the window 407 and switches on the video camera 413 to take an image of himself or herself. A resultant image captured by the video camera 413 is displayed in real time on the VDT 414. While viewing the image through the (unshown) half mirror, the client can determine a shooting proportion. The determined proportion is then displayed as a still image on the VDT 414.

If the displayed proportion is not accepted, it can be deleted by using a cancel switch (not shown). As a result, the video camera 413 starts again and its current image is displayed on the VDT 414. When a desired still image is obtained, it is transferred as the image data to the CPU 421.

Upon being received by the CPU 421, the image data of 64 mm long by 48 mm width is shifted by the editing means 419 to a passport size of 45 mm×35 mm which is then pasted in the passport pattern 420 of which each corner is marked with cutline markings 424.

In more detail, the image data of 64 mm×48 mm is scaled down in the CPU 21 by reducing 48 mm of width to 35 mm which is a width of the passport size. Accordingly, the reduced image has a length of 46.6 mm. Then, 46.6 mm is trimmed by 0.8 mm from both sides.

Similarly, the image data is shifted in the CPU 421 to a visa size by the same manner of calculating and editing as for the passport size.

More particularly, the image data of 64 mm×48 mm received by the CPU 421 is reduced to 50 mm×50 mm of the visa size. When 48 mm of the width of the image data is changed to 50 mm, the length turns to 66.6 mm which is then trimmed by 8.3 mm from both sides by the editing means 419. The resultant visa size of data is pasted on the visa pattern 420 accompanied with the cutline markings 424 at each corner.

The cutline markings 424 are printed to cut a desired size. As each photograph pattern 420 of the image is printed slightly greater by 1 to 2 mm at each side than its actual desired size, left and right cutting markings 424*a* of the cutline markings 424 at upper and lower ends of the pattern 420 are positioned inwardly of vertical edges 420*b* on the identification photograph sheet 416, and upper and lower cutting markings 424*b* at left and right ends of the pattern 420 are positioned inwardly of horizontal edges 420*a*. Accordingly, cutting is conducted between two corresponding markings 424 but not along the border lines or edges between the pattern 420 and a margin area of the sheet 416. This allows each photo to be cut without creating a no-image fragment at each edge even if the cutting is not straight.

After the image data is reduced to the passport or visa size by the calculating and editing operations, its RGB color signals of the optical format are converted to three print colors of the YMC format which are transmitted to the printer 417 for printing. As a result, the identification photo sheet 416 shown in FIG. 34 is obtained where the patterns 420 of the passport size and the visa size are printed with their respective cutline markings 424 appearing at each corner of each pattern 420.

The patterns 420 can easily be separated from each other by cutting the identification photo sheet 416 with a cutter along a rule (both not shown) which extends between the two corresponding cutline markings 424. Accordingly, each resultant identification photograph of the passport or visa size is produced with its top and bottom edges, and left and right edges well balanced.

Figure 36:
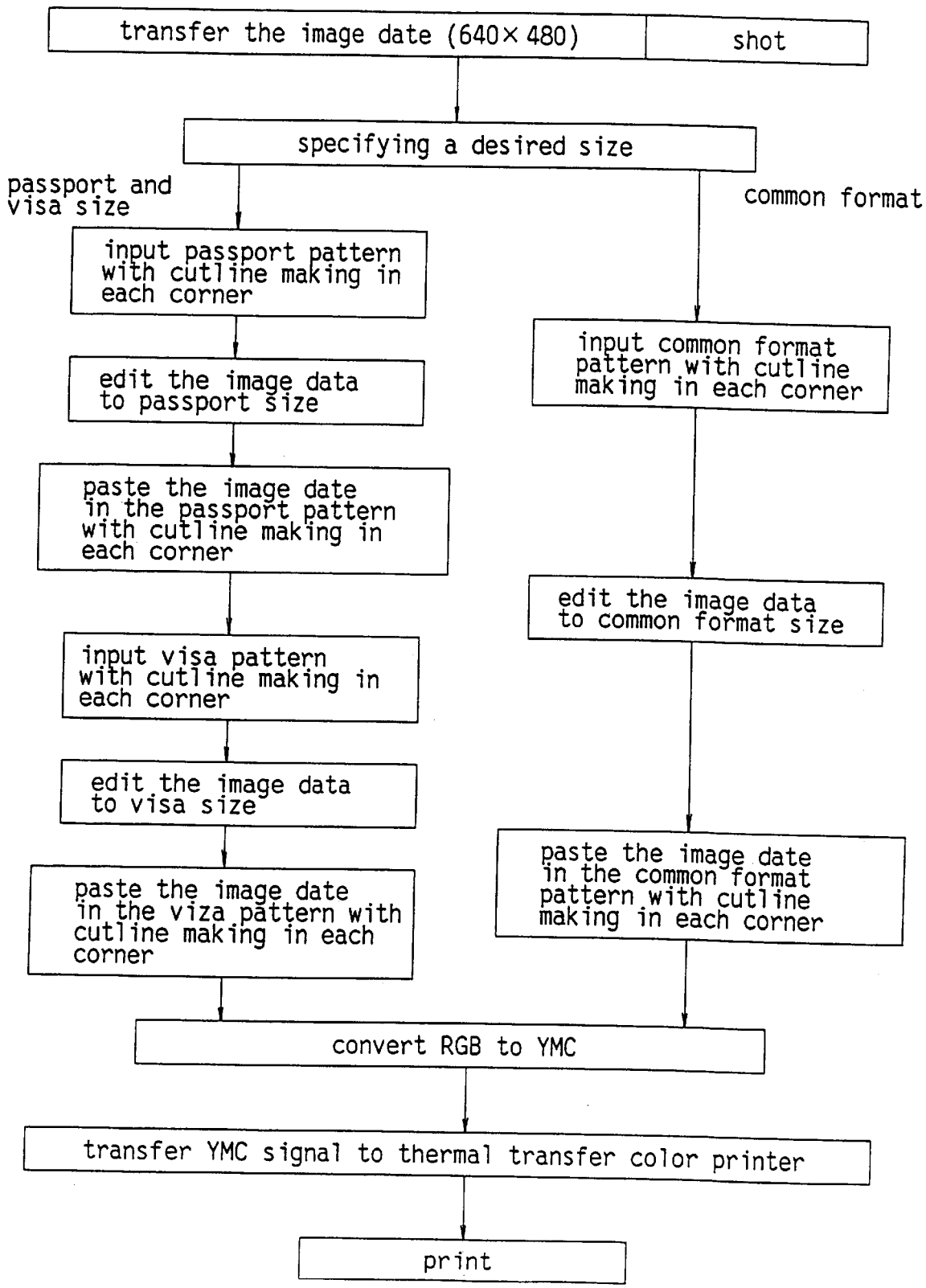
FIG. 36 is a flowchart of the operation of the automatic photographic processor apparatus for producing an identification photograph strip with cutline markings of Embodiment 5.

The size of identification photographs is not limited to the passport or visa size described in Embodiment 5 and any other sizes including a common format fabricated by the right row of steps in FIG. 36 can be produced successfully in the same manner as in Embodiment 5. Although the image taken by the video camera in Embodiment 5 is viewed in real time on the VDT, a given number of the same may be recorded on a magnetic tape or hard disk for allowing the client to select the most favorable one in playback.

What claimed is:

1. An identification photographic strip comprising:

at least one photographic print of a desired size printed on a printing sheet; and cutline markings printed on said printing sheet outside said print at locations relative thereto and suitable for facilitating cutting said print to a desired size from said printing sheet, said print having upper and lower edges and left and right edges, and said cutline markings comprising left and right markings located above and below said print and inwardly of said left and right edges thereof, and upper and lower markings located leftwardly and rightwardly of said print and inwardly of said upper and lower edges thereof.

2. An automatic photographic processor apparatus for producing an identification photographic strip having cutline markings, said apparatus comprising:

a reading means for reading an image;

an arithmetic operating device including a calculating means for converting data of the image read by said reading means to a specified size format and an editing means for editing image data from said calculating means to produce a background image data with cutline markings; and a printer for producing identification photographic prints from image data supplied from said editing means.

* * * * *